Feb. 14, 1956  W. T. GOLLWITZER ET AL  2,734,453
SKIP-PRINT CONTROL IN ADDRESS PRINTING MACHINES
Original Filed May 3, 1949  14 Sheets-Sheet 3

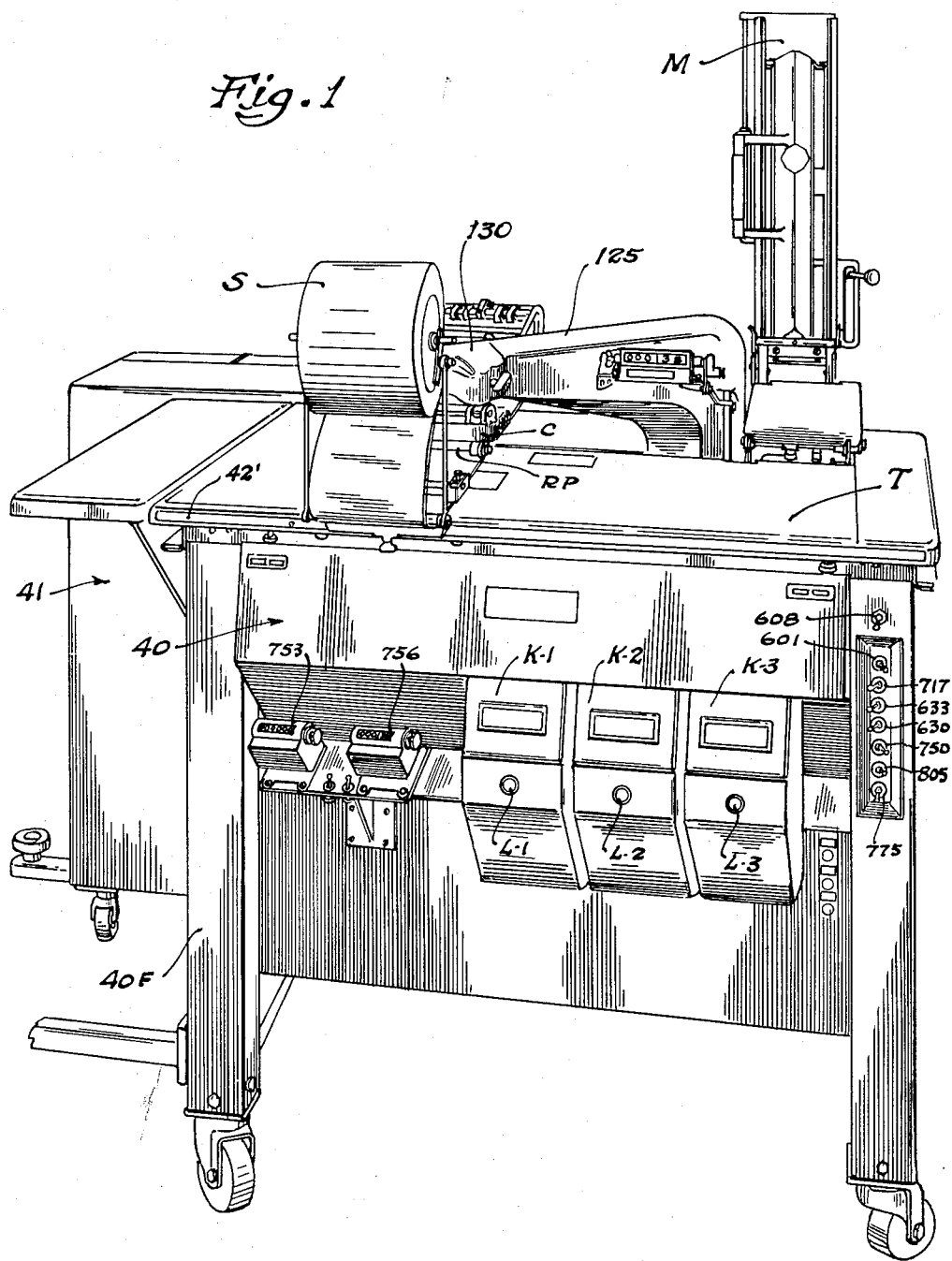

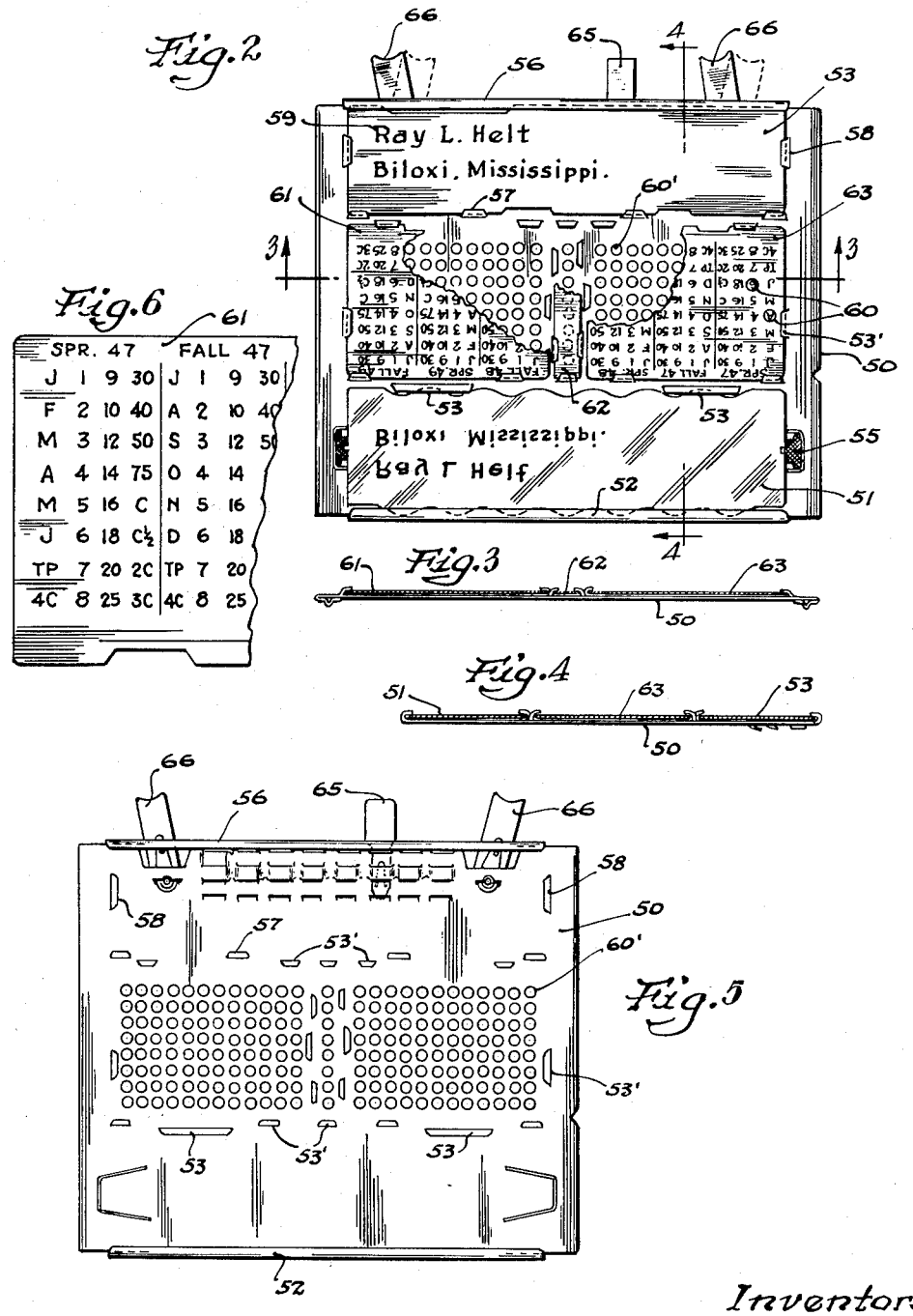

Inventors
Walter T. Gollwitzer
Robert H. Lease
By Wallace and Cannon
Attorneys

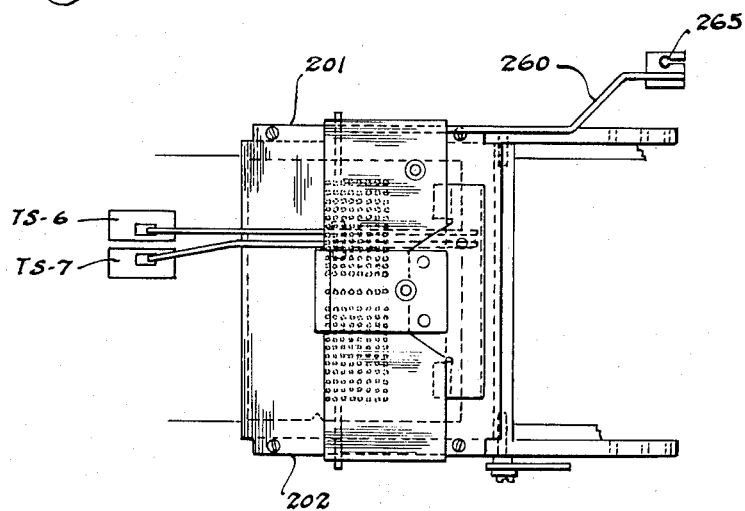
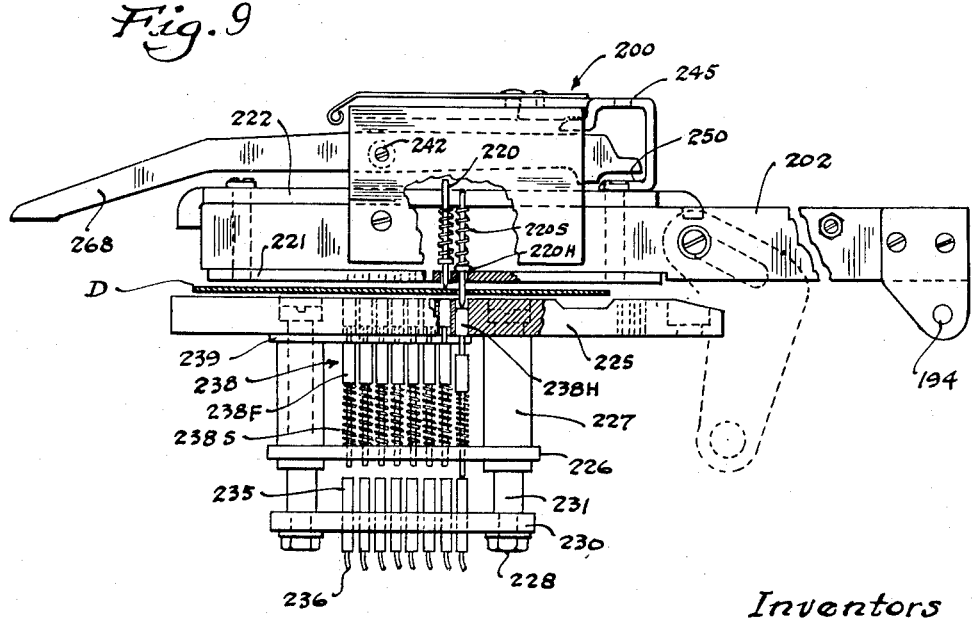

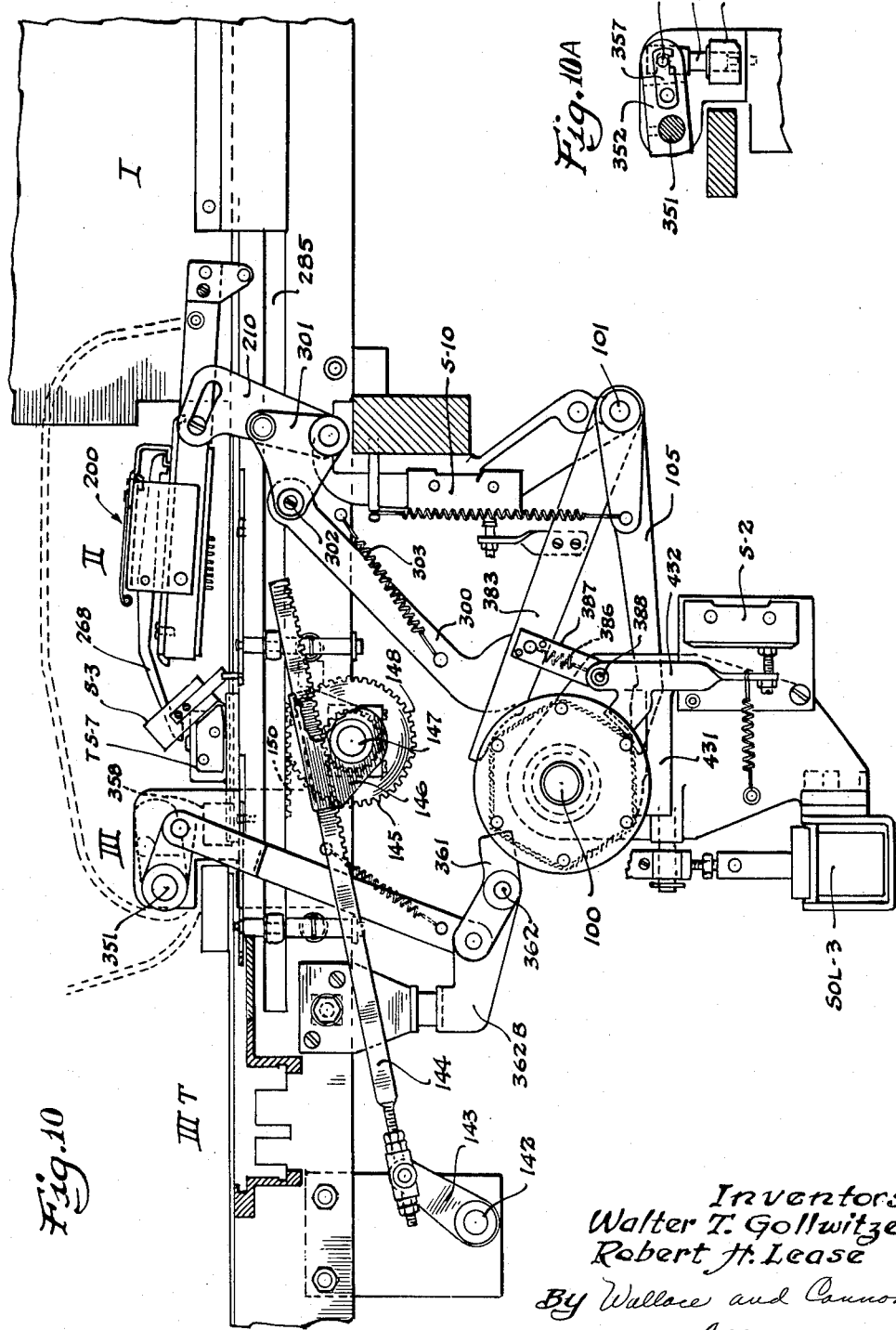

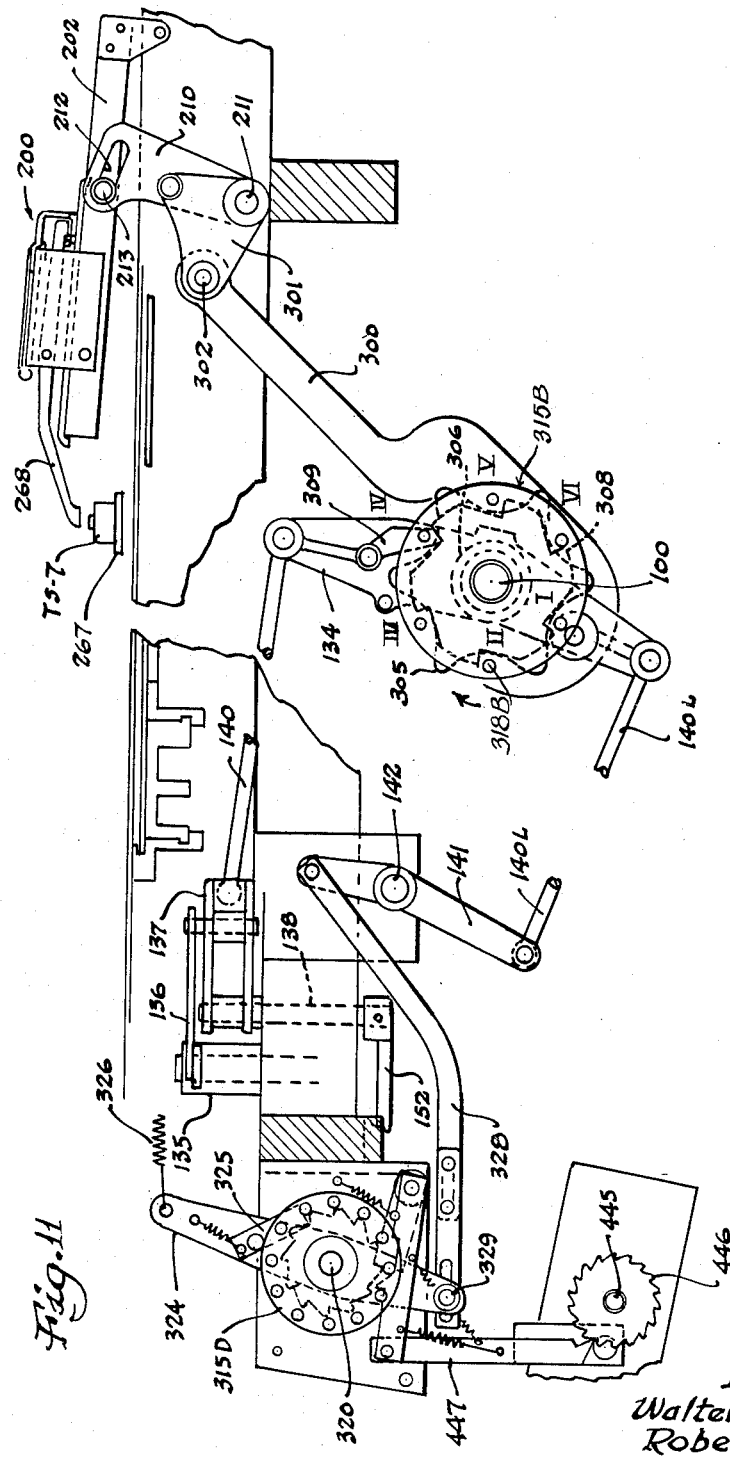

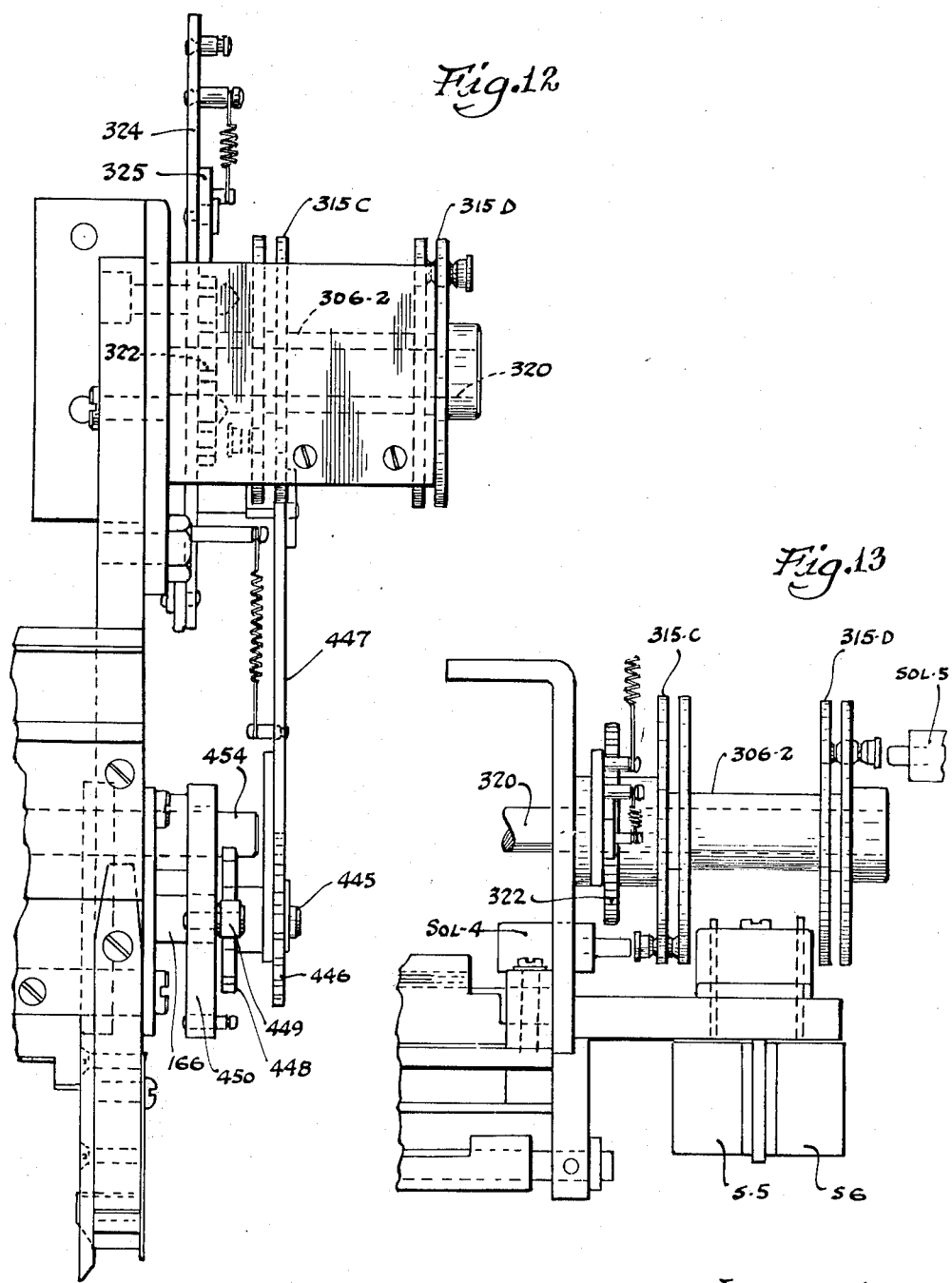

Feb. 14, 1956   W. T. GOLLWITZER ET AL   2,734,453
SKIP-PRINT CONTROL IN ADDRESS PRINTING MACHINES
Original Filed May 3, 1949   14 Sheets-Sheet 8

Inventors
Walter T. Gollwitzer
Robert H. Lease
By Wallace and Cannon
Attorneys

Feb. 14, 1956  W. T. GOLLWITZER ET AL  2,734,453
SKIP-PRINT CONTROL IN ADDRESS PRINTING MACHINES
Original Filed May 3, 1949  14 Sheets-Sheet 9
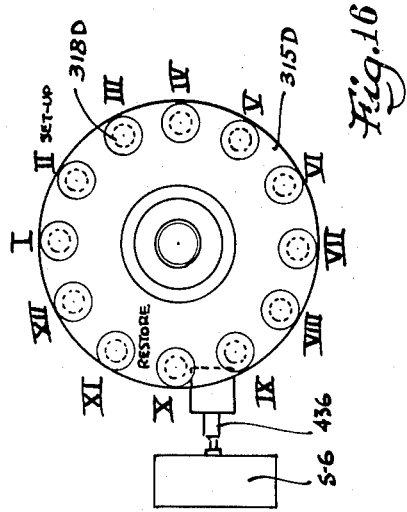
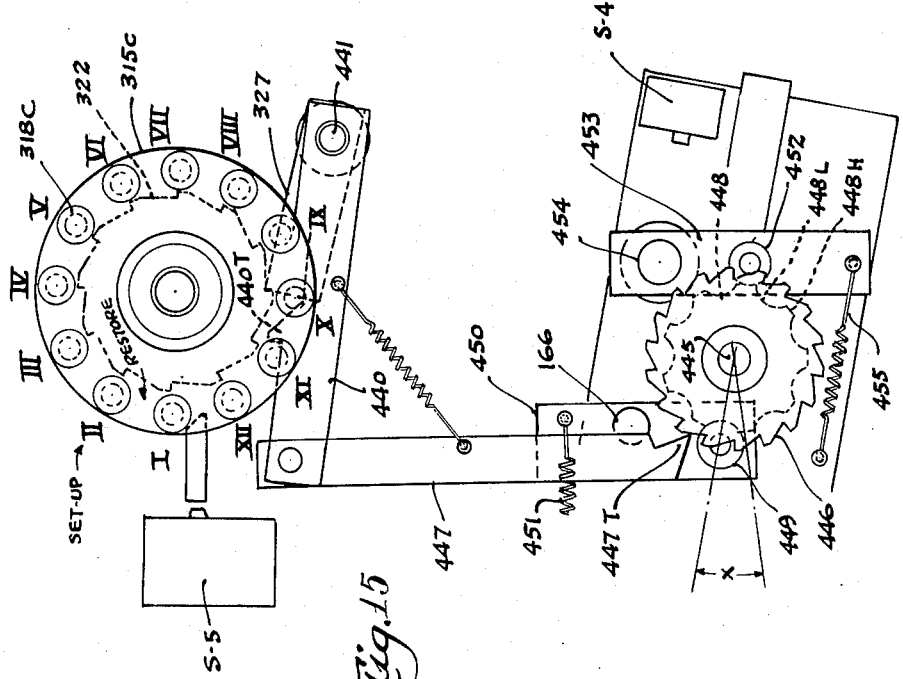
Inventors
Walter T. Gollwitzer
Robert H. Lease
By Wallace and Cannon
Attorneys

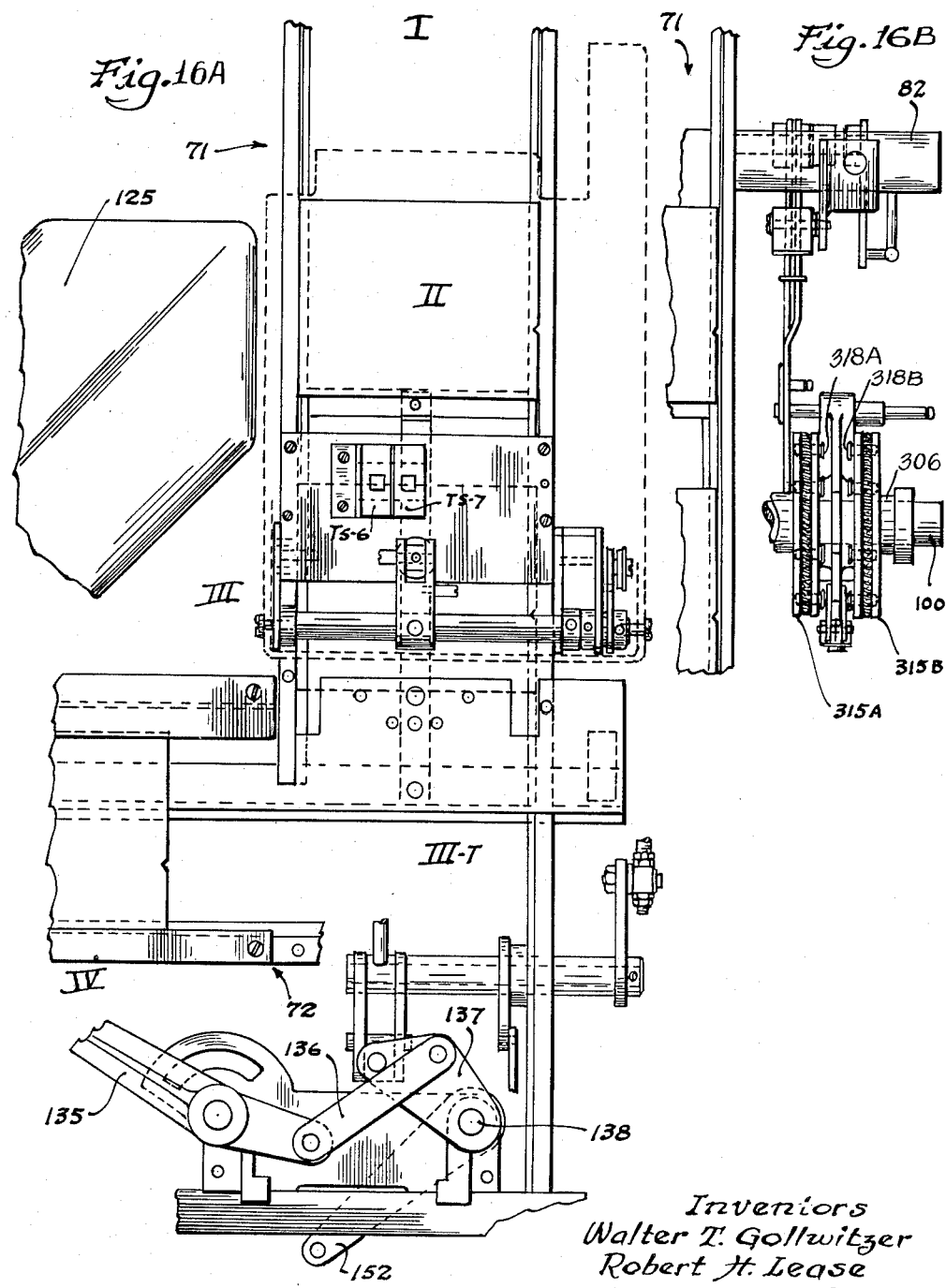

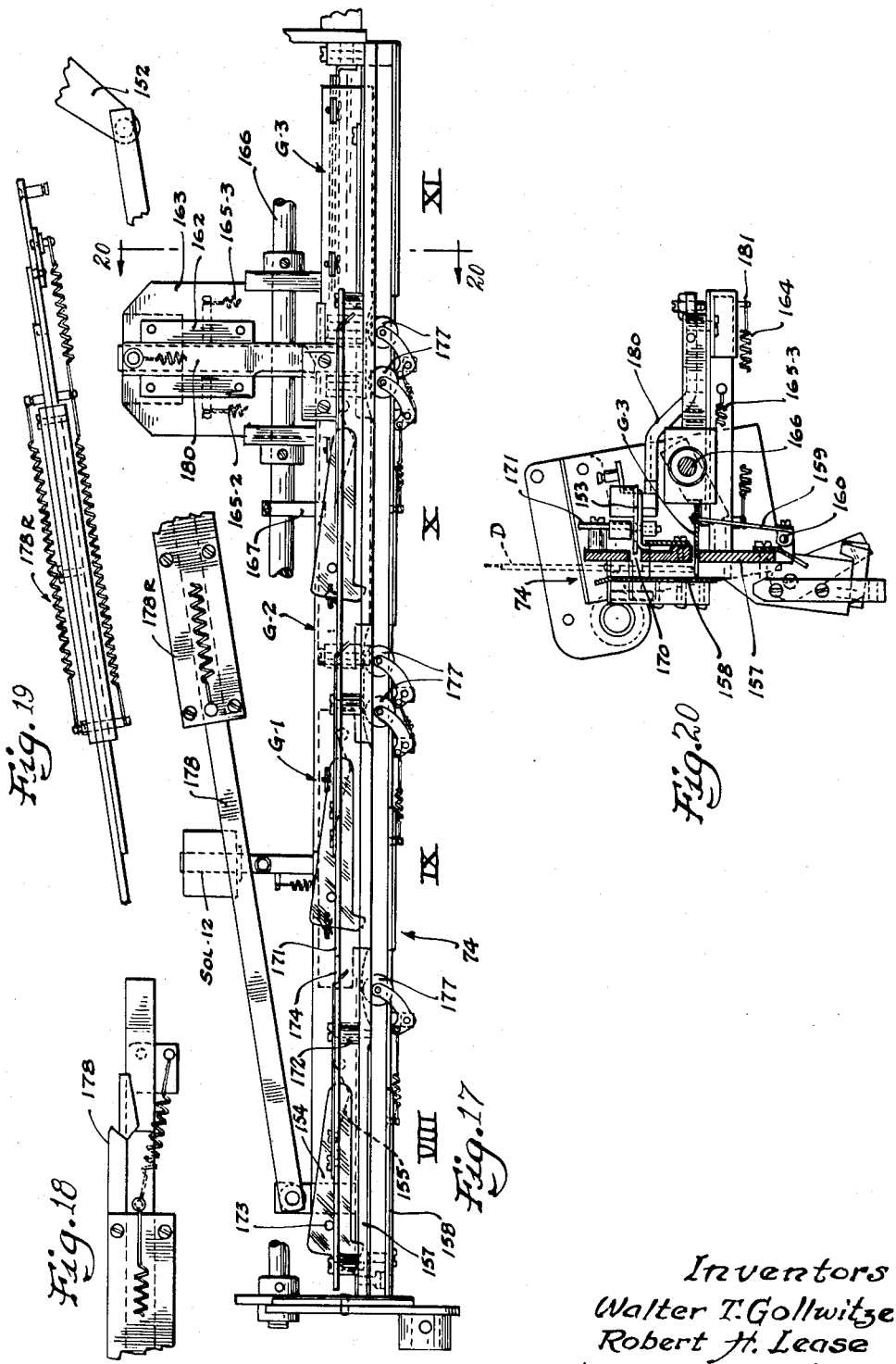

Feb. 14, 1956   W. T. GOLLWITZER ET AL   2,734,453
SKIP-PRINT CONTROL IN ADDRESS PRINTING MACHINES
Original Filed May 3, 1949   14 Sheets-Sheet 12
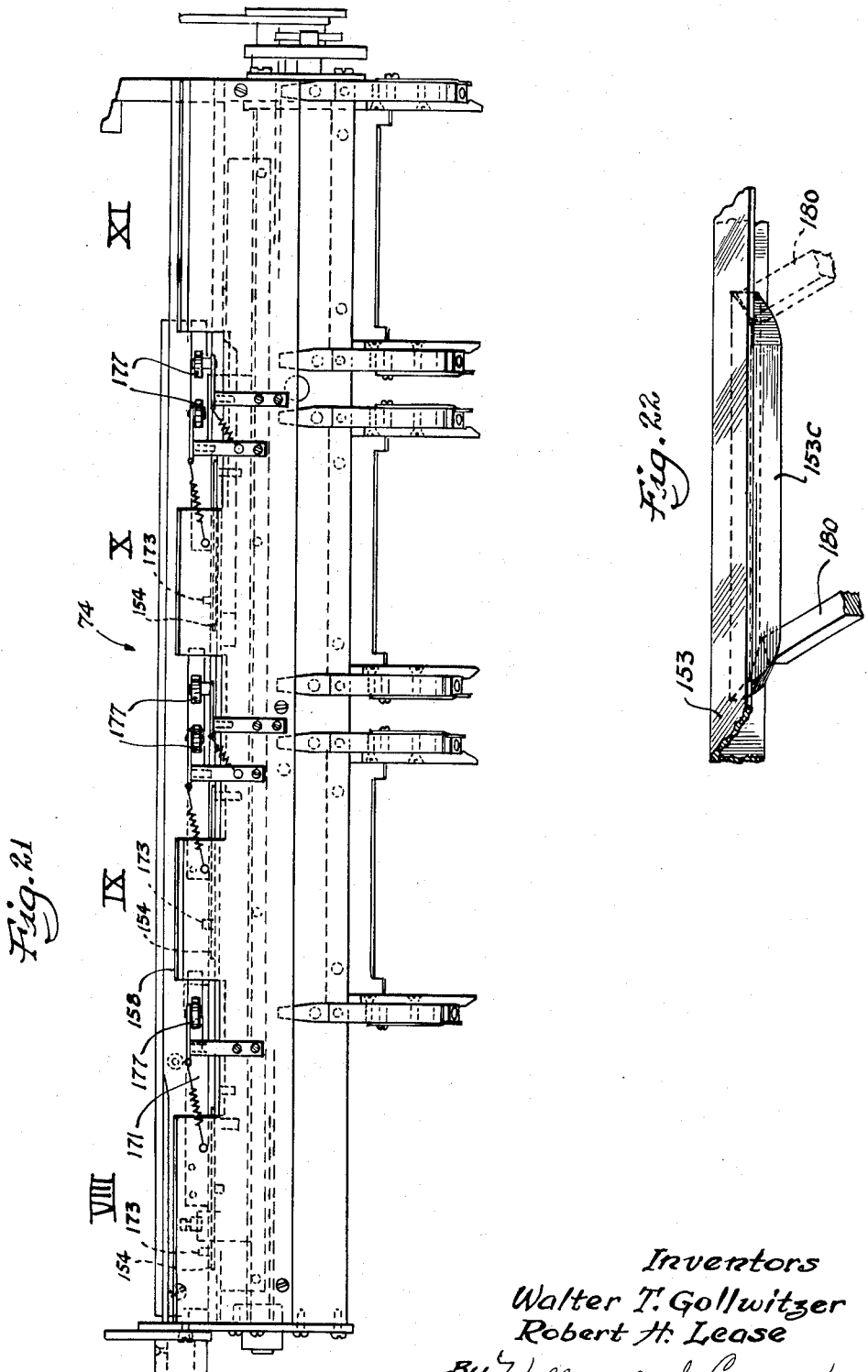
Inventors
Walter T. Gollwitzer
Robert H. Lease
By Wallace and Cannon
Attorneys Feb. 14, 1956 W. T. GOLLWITZER ET AL 2,734,453
SKIP-PRINT CONTROL IN ADDRESS PRINTING MACHINES
Original Filed May 3, 1949 14 Sheets-Sheet 13

Inventors
Walter T. Gollwitzer
Robert H. Lease
By Wallace and Cannon
Attorneys

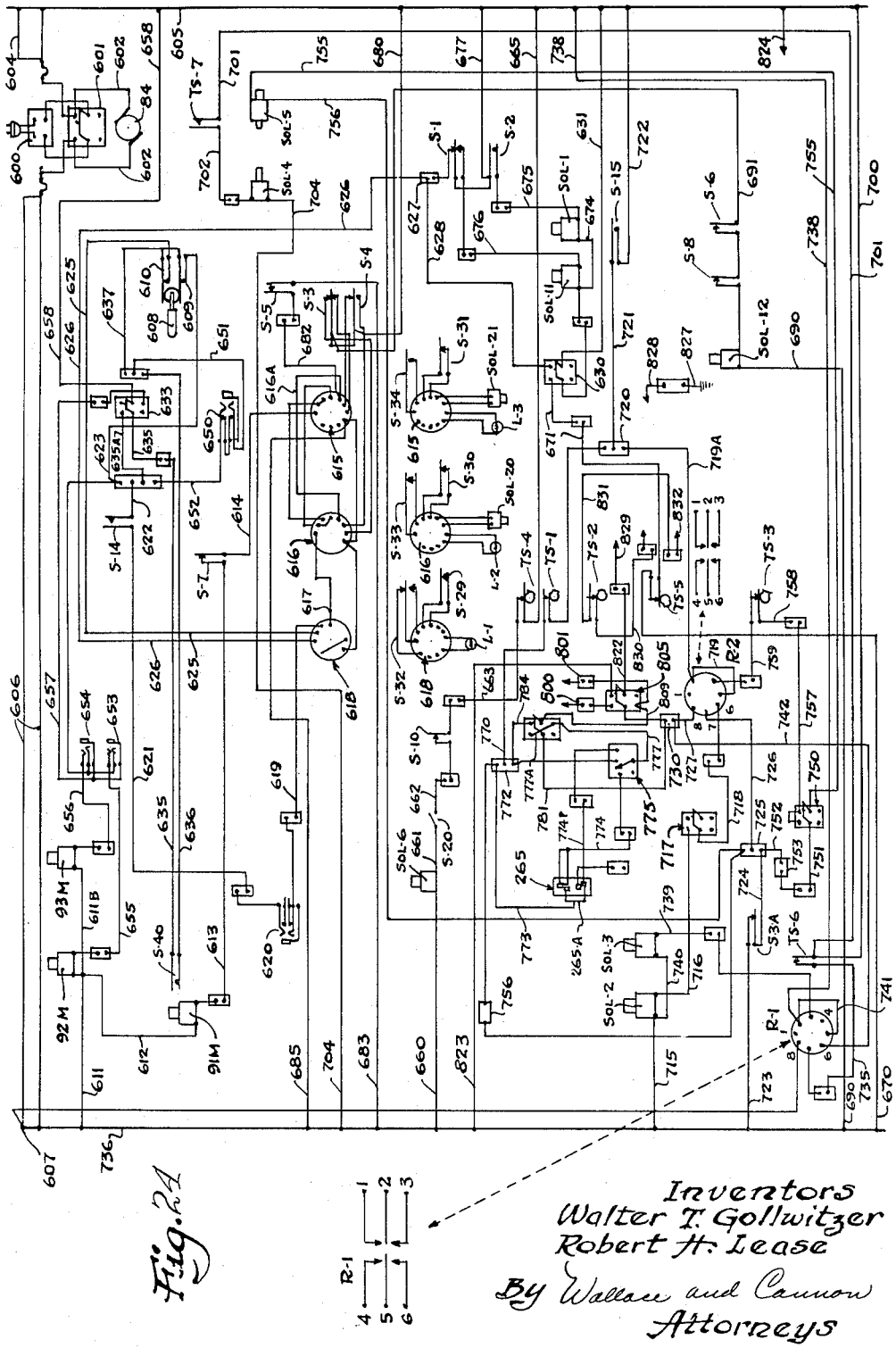

United States Patent Office 2,734,453
Patented Feb. 14, 1956

2,734,453

SKIP-PRINT CONTROL IN ADDRESS PRINTING MACHINES

Walter T. Gollwitzer and Robert H. Lease, Euclid, Ohio, assignors to Addressograph-Multigraph Corporation, Cleveland, Ohio, a corporation of Delaware Original application May 3, 1949, Serial No. 96,288, now Patent No. 2,697,396, dated December 21, 1954. Divided and this application December 4, 1951, Serial No. 259,850

2 Claims. (Cl. 101—58)

This application is a division of application Serial No. 96,288, filed on May 3, 1949, now Patent No. 2,697,396.

This invention relates to printing machines of the type which utilizes individual printing devices that are advanced one by one through the machine, and particularly the invention relates to mechanism for automatically distributing or directing the printing devices into collecting drawers at the end of their movement through the machine.

In various types of business it has been found advantageous to utilize individual printing and control devices which are passed one by one through printing machines that may take the form of a printing machine disclosed in Hueber Patent No. 2,359,849, patented October 10, 1944, and machines of the aforesaid character are adapted for use with automatic sheet feeding mechanism so that the machine may be continuously operated to produce printed impressions from the printing and control devices. The printed impressions may, of course, be made on individual sheets that are fed to the printing station of the machine as, for example, by the automatic sheet feeder disclosed in Morse Patent No. 2,359,852, patented October 10, 1944, or the printed impressions may be made on a continuous sheet such, for example, as a strip lister mechanism of conventional form that feeds the paper sheet or strip past the printing station of the printing machine in timed relation to the operations of the printing mechanism of the machine.

The individual printing devices that are passed through printing machines of the aforesaid character may take many different forms, and may be constructed if desired in the general manner disclosed in the Walter T. Gollwitzer Patent No. 2,132,412, patented October 11, 1938. As shown in the aforesaid Gollwitzer patent, the individual printing devices have a sheet metal carrier or frame that is adapted to removably receive a printing plate upon which embossed type characters may be formed to afford identifying means such as the name and address of a person or company to whom the particular printing device is allocated. Such printing devices also have a plurality of tab mounting means such as tab sockets afforded along what may be termed the upper edge of the printing device frame so that individual index or identifying tabs may be disposed in selected of the tab mounting sockets to serve as an identification or data representing means in respect to the particular printing and control device. In addition to the foregoing, such printing and control devices are arranged to have one or more data fields afforded thereon, and as disclosed in the aforesaid Gollwitzer patent, such data fields comprise areas having a plurality of index points located at different positions thereon. As shown in such Gollwitzer patent, these index points are afforded in a plurality of vertical columns, and at each index point where data is to be represented, a frame perforation is afforded in the printing device frame. Then, when data is to be represented on a data field, a control card is placed removably in position over such data field, and data may be represented in such data field by forming a control perforation in the control card at any one or more of the index positions of such data fields. Where such control perforations are provided at index points in a data field, the data represented by such perforations may then be sensed in the printing machine by sensing means which will pass through the aligned control perforations and frame perforations to accomplish control operations in the printing machine or related mechanisms.

As disclosed in Walter T. Gollwitzer Patent No. 2,390,583, patented December 11, 1945, provision may be made in a printing machine utilizing individual control devices for automatically governing the discharge of the printing and control devices from the machine and into collecting drawers, and as shown in such patent, two drawers are provided and the printing devices are discharged first into one of these drawers and then under control of a tab on the last printing device that is to go into a particular drawer, the discharge point of the printing and control devices is changed so that the printing devices are then discharged into the second one of such collecting drawers. The discharge point is alternately changed so that the drawers may be removed and replaced alternately, and when the run is completed, all of the printing devices will have been returned to the same drawer from which they were originally removed. The important object of the present invention is to simplify the controlling operations in respect to the collecting drawer mechanism of the aforesaid Gollwitzer Patent No. 2,390,583.

In many uses of printing machines of the aforesaid character, it is desirable to remove certain of the printing devices from the collection of printing devices in accordance with the operation of the selector mechanism as, for example, when some particular control data or indication is sensed upon a printing device, and in such instances the printing and control devices that are to be removed from the collection are discharged into what is termed an "expiration" drawer in some instances or a "cull" drawer in other instances, and a further object of the present invention is to enable the control mechanism of the printing device discharge means of the aforesaid Gollwitzer Patent No. 2,390,583 to cooperate in the attainment of a culling operation wherein selected of the printing and control devices are removed from the collection of printing and control devices and are discharge into a cull drawer.

Other and further objects of the present invention will be apparent from the following description and claims and are illustrated in the accompanying drawings, which, by way of illustration, show a preferred embodiment and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a front perspective view of a printing apparatus embodying the features of the invention;

Fig. 2 is a front face view of a printing and control device adapted for use in the machine shown in Fig. 1;

Fig. 3 is a sectional view taken along the line 3—3 of Fig. 2;

Fig. 4 is a sectional view taken along the line 4—4 of Fig. 2;

Fig. 5 is a front face view of the frame of the printing and control device shown in Fig. 2;

Fig. 6 is an enlarged fragmentary elevational view of one of the control cards utilized on the printing and control device of Fig. 2;

Fig. 8 is a top plan view of the sensing head;

Fig. 9 is a side elevational view of the sensing head;

Fig. 10 is a fragmentary vertical sectional view illustrating the sensing head and the related parts of the machine;

Fig. 10A is a fragmentary vertical sectional view illustrating details of the punching apparatus;

Fig. 11 is a fragmentary vertical sectional view illustrating the drive means for the storage drums and a part of the printing device advancing means;

Fig. 12 is a front elevational view of other storage mechanism employed in the machine;

Fig. 13 is a fragmentary top view of the mechanism shown in Fig. 12;

Figs. 15 and 16 are diagrammatic views illustrating two of the four storage mechanisms and the mechanisms that are controlled thereby;

Fig. 16A is a fragmentary top plan view;

Fig. 16B is a view illustrating the storage mechanism that is located adjacent to the punching mechanism;

Fig. 17 is a top plan view of the distributing portion of the printing and control device feed path;

Fig. 18 is a fragmentary portion of the drive mechanism illustrated in Fig. 17;

Fig. 19 is a front elevational view of a portion of the drive mechanism shown in Fig. 17;

Fig. 20 is a fragmentary vertical sectional view showing details of the discharge mechanism associated with the mechanism of Fig. 17;

Fig. 21 is a front elevational view of the printing and control device distributing path and showing its relationship to the collecting drawer mechanisms;

Fig. 22 is a perspective view showing the cam and cam follower for actuating certain of the distributing gates;

Fig. 24 is a schematic wiring diagram of the circuits in the printing machine.

Figure 7:
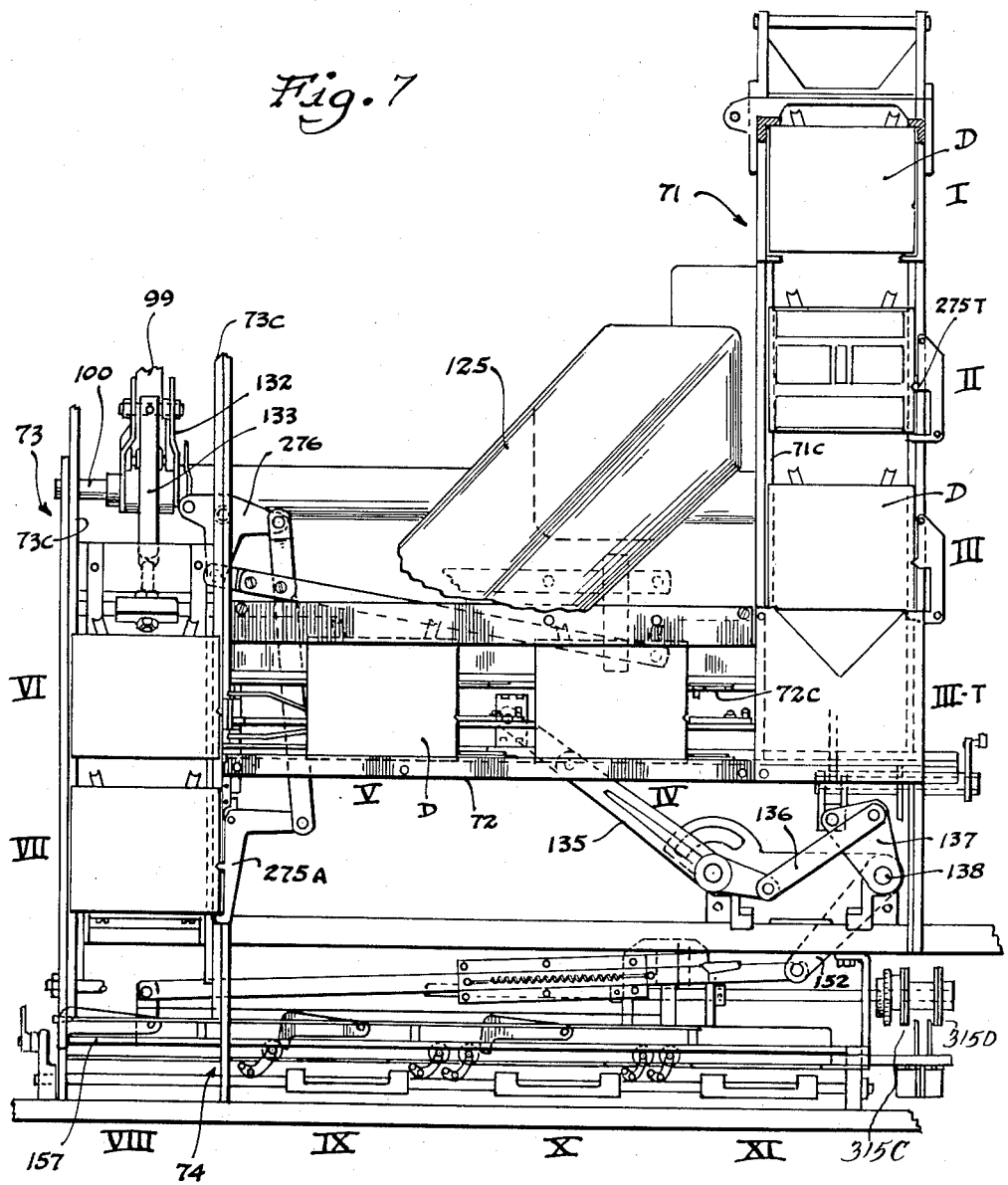
Fig. 7 is a fragmentary plan view of the machine shown in Fig. 1 with the cover plates removed so as to show the path of the printing and control devices as they move through the machine.
Figure 14:
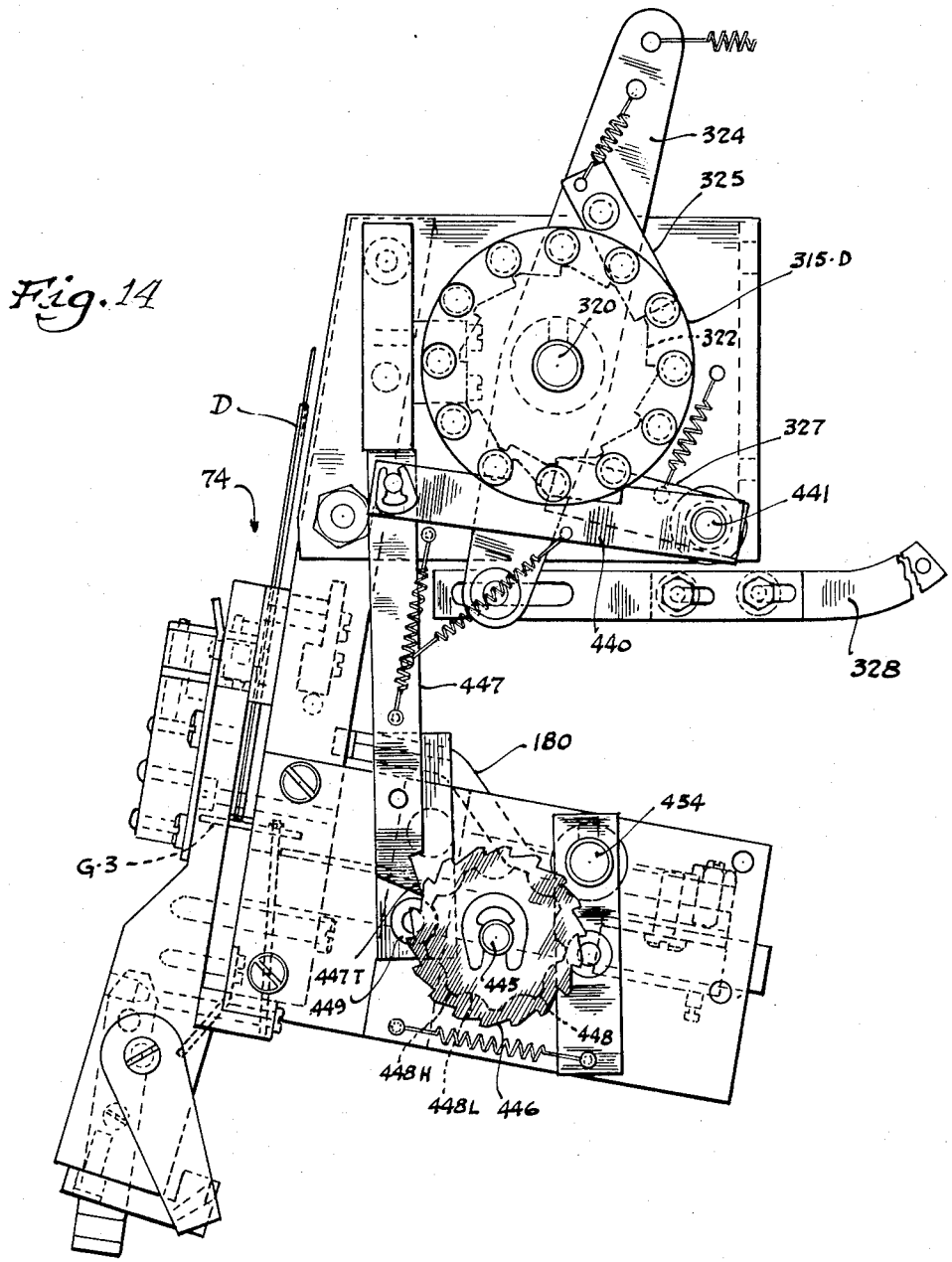
Fig. 14 is a side elevational view of the forward storage mechanism and illustrating its relationship to the drawer change and control mechanism.

For purposes of disclosure, the invention is herein illustrated as embodied in a printing apparatus comprising a printing machine 40 having a qualifier unit 41 operatively associated therewith in a separable relation for cooperation in a controlling relation so that operations of the printing machine 40, such as the print or skip operation thereof, may be controlled and printed impressions may be selectively printed from the printing means of printing and control devices D, Fig. 2, and under control of control means carried by such printing and control devices D, that are passed through the printing machine 40. The impressions may, of course, be made on sheets S that may take different forms such as a mailing strip or sheet S of Figs. 1 and 2, that is passed in a step by step manner past the printing station of the printing machine 40, or in other instances individual sheets may be fed into and then out of printing position by means such as the sheet feeder covered by Morse Patent No. 2,359,852, patented October 10, 1944. The sheet feeding means, are, of course, related to the printing machine 40 in such a manner as to operate in timed relation to the operations of the impression means of the printing machine 40.

While the particular form and arrangement of the printing machine 40 is in many aspects of the present invention immaterial, the particular printing machine 40 that is herein shown is of the type wherein a series of individual printing and control devices D, Fig. 2, each bearing printing means and control means thereon, are advanced one by one from a supply means such as an upstanding magazine M to a printing position provided in the machine. The printing position may in the present instance be considered as being defined in part by an impression means such as the platen mechanism P. The magazine M is supported on a printing machine frame 40F which in the form herein shown is generally desklike in character so as to provide a table top T upon which sheets, forms and the like may be supported beneath the platen mechanism P for the performance of the printing operations thereon. In the operation of the printing machine 40 the printing devices D are withdrawn one by one from the bottom of the upstanding magazine M and are advanced in a step-by-step manner into a series of stations along a feed path beneath the table top T until each printing device comes to rest at printing position. The printing position is indicated in Fig. 1 of the drawings by the platen P, and it is while the printing device D is at rest at printing position that the platen mechanism P is operated to produce a printed impression from all or selected portions of the type characters embodied in the printing device. After one or more printing operations have been performed thereon or therefrom, the printing device D is further advanced so as to be discharged into a distributing guideway along which such devices are thereafter advanced in a step-by-step manner for selective discharge into any one of three collector drawers K–1, K–2 or K–3 as will hereinafter be described. The form and construction of the printing machine 40 will be described herein only insofar as it is directly related to the attainment of control operations such as the distribution of the printing devices D, and for further details of the construction and operation of the printing machine 40 reference may be had to Hueber Patent No. 2,359,850, patented October 10, 1944.

*The printing devices*

The printing and control devices D may be of many different types, and the characteristics of the printing device must, of course, be related in each instance to the construction and operational characteristics of the printing machine. For use in connection with the printing machine 40 herein shown, a printing and control device of the general character disclosed, for example, in Gollwitzer Patent No. 2,132,412, patented October 11, 1938, may be employed. In other instances, where a different construction and arrangement is provided in the printing machine, a different type of printing device, such for example as the printing device shown in Gollwitzer Patent No. 1,992,661, patented February 26, 1935, may be employed. In other instances, the present invention may also be utilized with printing machines which employ printing devices of the stencil type wherein a thin sheet of stencil paper is incorporated in a protective carrier or frame. In all of the various kinds of printing devices of this general class, the printing means of each printing device is arranged to embody various classes of data to be printed, and such data is disposed in a plurality of lines disposed one above another upon the operative face of the printing device. As shown in Fig. 2, it will be evident that the several lines of embossed type are formed upon a printing plate 51 which are carried on one face of a frame 50. The printing device D is, in the present instance, provided with a single printing plate 51 which is removably held in position on the operative face of the printing device D by retaining means formed on the frame 50. The printing plate 51 is held in position by a curled lower edge 52 and lugs 53, and spring latches 55 serve to releasably engage notches in the end edges of the printing plate 51 to hold the same in position on the frame 50. Spaced from the printing plate 51, and adjacent the opposite edge of the frame 50, an index and data carrying card 53 is held in place by a curled edge 56 on the frame 50 and cooperating lugs 57 and 58. A printed impression as at 59 may be formed on index card 53 from a part of the printing means of the printing device so that the printing device may be readily identified.

The printing and control devices D are each arranged to carry data representations that may be sensed so as to control the functioning of the printing machine 40 and such data representations in the present instance are afforded by perforations 60 that are formed in any one of several data fields of the control device D in accordance with a predetermined positional code. In the printing and control device D as herein shown, the several data fields are afforded by three separate control cards 61, 62 and 63, the control card 62 being relatively narrow and elongated in a vertical direction while the control cards 61 and 63 are relatively large and are disposed on opposite sides of the control card 62 in the area between the printing plate 51 and the index card 53. The control cards 61, 62 and 63 are held in place by retaining devices 53' that are formed from the metal of the frame 50.

As herein illustrated, the control card 62 is arranged to afford eight index positions at any one or more of which control perforations 60 may be formed. The index points afforded on the control card 62 are arranged in a vertical column, and at each index point, the frame 50 has a frame perforation 60' formed therein.

The control cards 61 and 63 are of generally similar form and each of these cards is arranged to afford three data fields, each of which includes four vertical columns of index positions with eight index positions in each such column. The particular printing device D that is shown herein is intended and particularly adapted for use in connection with mail order sales, and each of the three fields on the card, as 61, is allocated to a particular season of a particular year, as indicated by the printed identifying headings 65. The several index points within each one of the three fields afforded on the card 61 are allocated to the indication of the same informational values, and as will be noted in Fig. 7, the upper six index points in the left-hand column of the field are allocated to the various months in the season to which such field is allocated. Thus the initial letters of the months from January to July are indicated in these six positions. The seventh position in this column, that is, the one that is next to the bottom position, has the letters "TP" printed therein, and this indicates that this index position is allocated to the representation of a particular class of preference to the customer to which the printing device D pertains.

All of the other index positions in each field are allocated to different money values so that the amount of an order received from the particular customer in a particular season may be recorded in the proper data field by forming a perforation 60 at the index point allocated to approximately the money value of such purchase. Thus the money values allocated to the several index points in the data field are indicated in the present instance as dollar values, and different index points are allocated to the even dollar values from 1 to 10, and above this amount the dollar values are more widely separated so that relatively high value purchases may be indicated. Thus the letter "C" is used in association with a figure to indicate increments of hundred-dollar values, and as herein shown the highest value to which an index point is allocated is four hundred dollars.

In recording purchases in the fields of the printing and control device D, the month of such purchase is recorded by making a control perforation 60 at the index point allocated to such month in the particular season, and the approximate dollar value of the purchase is indicated by making a control perforation 60 at the appropriate value representing index point. When a subsequent purchase is made in a season, the new value is added to the highest previously recorded value, and the sum is indicated by a control perforation at the proper index point.

Such representations as to the months in which purchases have been made and as to the total dollar value of such purchases in any particular season may thus be utilized in accordance with the present invention to determine whether or not a mailing slip or tag is to be printed from the printing and control device D, and this is accomplished through the use of the selector mechanism of this invention which, of course, includes the qualifier unit 41.

The printing devices D are in many instances classified into a relatively large number of groups or classes and such classification may be attained by suitable identifying means provided at selected identifying positions on the printing device D. In the present instance the printing device D, shown in Fig. 2, has a plurality of identifying tabs 65 disposed at selected positions along its upper edge in the general manner disclosed in the aforesaid Gollwitzer Patent No. 2,132,412, and in this connection it will be noted that a relatively large number of identifying positions are provided along the upper edge of the frame 50 and that the identifying means or tabs 65 in Fig. 2 are disposed in but selected ones of such identifying positions. The printing and control device D as shown in Fig. 2 also has a pair of shift tabs 66 mounted thereon, these tabs in the present instance being located adjacent to the opposite ends of the upper edge of the printing and control device. The shift tabs 66 as herein shown are of the construction illustrated in the Walter T. Gollwitzer Patent No. 2,080,417, patented May 17, 1937, but it will be recognized that other forms of shiftable tab mechanism may be employed.

The data which is to be printed from each printing device is, as aforesaid, disposed upon the operative face of the printing device D in a series of lines, and when a printing device such as that shown in Fig. 2 is employed, the type characters may be formed on the printing plates 51 through the use of an embossing machine such as that shown in the patent to Duncan No. 1,518,904 patented December 9, 1924. With such a machine type characters are embossed in the metal of the printing plate 51 so that when a sheet is pressed into operative association with the embossed faces of such type characters a corresponding printed impression is made therefrom. It will be recognized, of course, that the type characters must in every instance be properly inked and this may be properly attained through inking of the type characters prior to the printing operation or through the use of an inked ribbon which is interposed between the type characters and the sheet at the time when the printing impression made.

The printing machine

The printing machine 40 herein illustrated is of the type wherein the impression means is provided by the platen mechanism P, and this platen mechanism is supported in an operative relationship above the table top T by means of a rigid printing frame 125, the specific construction of which is illustrated and described in Hueber Patent No. 2,275,439, patented March 10, 1942. The printing frame 125 is in the present case disposed so as to project upwardly from the table top T at a point located a considerable distance rearwardly and to the right of the printing position, and the printing frame extends forwardly at an angle of substantially 45° with respect to the forward edge 42' of the printing machine frame, thereby to locate the forward end of the printing frame 125 directly above the printing position. The magazine M is located just to the right and somewhat rearwardly of the vertically extending portion of the printing frame 125 and the printing devices D are advanced from the bottom of the magazine M in a forward direction and then along a suitable guide path beneath the table top T and to printing position, as shown in Fig. 7 of the drawings. The particular arrangement and construction of the printing device feeding path as used in the present machine is disclosed in a general way in the aforesaid Hueber Patent No. 2,359,850. The printing device advancing means of the printing machine is arranged to advance the printing devices in a step-by-step manner such that each printing device comes to rest at a plurality of different stations along the printing device guideway, and in the machine herein disclosed the magazine position is identified as station I, Fig. 7, and from this position the devices are advanced to a sensing station II at which the identifying means such as the tabs 65 and the data representing perforations 60 may be sensed to determine whether or not a printed impression is to be made from such printing and control device when the printing and control device reaches the printing station of the machine. Such sensing of the data representing perforations 60 and the tabs of the printing and control device may also be utilized, as will hereinafter be described, to determine whether or not the particular printing and control device is to be withdrawn from the collection as is done in a culling operation that will hereinafter be described in detail.

The magazine station I and the sensing station II are located along an initial printing device guideway 71, Fig. 7, and forwardly of the sensing station II, an additional station III is afforded which in the present instance constitutes a recording station at which a control perforation 60 may be formed in the control card 62 under control of the selecting and qualifying mechanism, as will hereinafter be described. Forwardly of the recording station III, the initial printing device guideway 71 intersects with a transverse or intermediate guideway 72, and this intersection is arranged to define a transfer station III–T in the same general manner as described in the aforesaid Hueber Patent No. 2,359,850. In the cycle in which a printing and control device is advanced from recording station III to the transfer station III–T, the printing device does not come to rest for any appreciable time in the transfer station, but is almost immediately moved to the left in Fig. 7 along the transverse guideway 72 to a second recording station IV, and this recording station in the present machine is the location at which the shift tabs 66 may be selectively moved from one position to another so as to record the results of the selecting or qualifying operation of the machine, as will hereinafter be described. In the next cycle of machine operation, the printing and control device is moved to an idle station V in the guideway 72, and then in the next machine cycle this printing device is moved into a second idle station that is located in a third guideway 73 that extends from front to rear of the machine and which includes printing station VII that is located immediately forward of the idle station VI. Hence, the next movement of the printing and control device D is such that this printing and control device moves into printing station VII, and while it is in this printing station, an impression may be made from the printing means of the printing and control device.

In the cycle of machine operation that follows, the printing device that is in printing station VII is discharged forwardly and downwardly and into a generally vertical position into station VIII at the left end of what may be termed a transverse distributing guideway 74 that extends to the right and over the three collecting drawers K–1, K–2 and K–3, so that as the printing devices are moved to the right along the guideway 74, they may be selectively discharged into these collecting drawers, as will hereinafter be described. The printing device that is discharged downwardly from the guideway 73 and into the distributing guideway 74, comes to rest in station VIII of the distributing guideway, and in the next cycle is shifted to the right, Fig. 7, and into a first discharge station IX that is located over the collecting drawer K–1, which drawer in the present instance constitutes the cull drawer into which printing devices are discharged when it is desired to remove such printing devices from the general collection thereof. In the next machine cycle, the printing device, unless it has been discharged into the drawer K–1, is moved further to the right in Fig. 7, to station X, and from this position may be discharged into the collecting drawer K–2. In the event that the printing device is not discharged into the collecting drawer K–2, it is moved in the next cycle of machine operation to station XI that is located over the collecting drawer K–3.

The means for advancing the printing and control devices D along the guideways 71, 72, 73 and 74 are described in detail hereinafter, but it may be pointed out that the advancing means in the intermediate guideway 72 and in the third guideway 73 are quite similar to the advancing means shown in the aforesaid Hueber Patent No. 2,359,850, while the advancing means in the guideways 71 and 74 are constructed and operated in a manner that will be described presently.

The basic driving means employed in the printing machine 40 correspond in most respects to the driving mechanism illustrated and described in the aforesaid Hueber Patent No. 2,359,850, and such driving means are illustrated herein only insofar as such driving means are different from the disclosure of the aforesaid Hueber patent. Reference may of course be made to our aforesaid parent application for further details of the driving mechanism, but for present purposes it may be pointed out that each time the printing device advancing means are to be operated, an operating link 99, Fig. 7, is operated through a generally horizontal reciprocating stroke whereby rocking movement is imparted to a shaft 100. This shaft 100 is utilized in its rocking movement to impart the desired advancing movements to the printing and control devices D, and for other purposes, as will hereinafter be described. Also it may be noted that the operation of the platen P is governed by a platen clutch as described in said Hueber patent. The sensing operation, through the intermediary of the qualifier unit 41, may be effective, as will hereinafter be described, to govern the operation of the platen clutch and hence platen mechanism P when the particular printing device from which a sensed indication is derived reaches printing station VII. Such controlling operation is described in detail in our aforesaid parent application.

*The printing device advancing means*

As pointed out hereinbefore, the printing device driving means include a link 99 that is connected to a rocking lever 132 that is fixed on the rock shaft 100, and thus the shaft 100 is operated through a rocking movement each time the clutch 92 operates through its cycle of movement. The arm 132 also has a connecting link 133 extended therefrom and connected to carrier bars 73C that are mounted in the third guideway 73. This arrangement is substantially the same as that illustrated in the aforesaid Hueber Patent No. 2,359,850.

At its other end as shown in Fig. 11, the shaft 100 has a lever 134 fixed thereto, and this lever is utilized, among other things, for operating the carrier bars 72C of the intermediate guideway 72. The carrier bars 72C are connected by a rocking lever 135 and a link 136, Fig. 7, to a rocker 137 that is fixed on a vertical pivot shaft 138 in the same manner as in the aforesaid Hueber Patent No. 2,359,850, so that by imparting rocking movement to the rocker 137, the carrier bars 72C may be reciprocated in the proper timed relation to the carrier bars 73C. In the present instance this connection is afforded by a link 140 that is extended forwardly from the upper end of the lever 134. This serves to actuate the carrier bars 72C in the same timed relationship as was disclosed in the aforesaid Hueber patent. The lever 134 is also utilized to drive carrier bars 71C that are afforded in the initial guideway 71, and in accomplishing this the lower end of the lever 134 has a link 140L extended forwardly therefrom and connected to the lower end of a centrally pivoted rocker 141. The rocker 141 is mounted on a horizontal shaft 142 that extends outwardly beyond the right-hand side of the printing device guideway, Fig. 10, and an arm 143 is extended upwardly and somewhat rearwardly from the shaft 142 as shown in Fig. 10 of the drawings. The arm 143 has a rack 144 extended rearwardly and upwardly therefrom as shown in Fig. 10, and this rack extends through a guide 145 which holds the rack in engagement with a pinion 146. The pinion 146 is fixed on a horizontal shaft 147 that extends beneath the guideway 71 and the shaft 147 has gears 148 fixed thereon that mesh with downwardly facing racks 150 that are formed on the lower edges of the carrier bars 71C. Thus, as an incident to the rocking movements of the shaft 100, the carrier bars 71C are reciprocated in timed relation to the movements of the other carrier bars, and it might be observed in this regard that the carrier bars 71C and the carrier bars 73C move forwardly in the first half of each cycle while the carrier bars 72C of the intermediate guideway move in a return direction to the right at the time when the carrier bars 71C and 73C are moving in their forward or advancing direction.

The shaft 138 that is operated by the rocker 137 is utilized in the present instance to operate the printing device advancing means of the final or distributing guideway 74, and for this purpose an arm 152 is extended forwardly and to the left from the lower end of the shaft 138, as will be evident in Figs. 7 and 11. The arm 152 is utilized to impart reciprocating movements to a pawl carrier 153 that is disposed along the rear side of the printing device guideway 74 for reciprocation along such guideway. The pawl carrier 153 has a plurality of pawls 154 mounted thereon at spaced positions, and those pawls are spring biased by means of springs 155 toward positions wherein the noses of the pawls are disposed within the printing device guideway 74 for operative engagement with the left-hand end edges of such printing devices to move such printing devices in a step by step manner to the right as viewed in Figs. 8 and 19.

The printing device guideway as herein shown is afforded by a relatively rigid back plate 157, Figs. 7, 17 and 20, and from this back plate 157 a front plate 158 is supported in a parallel and forwardly spaced relationship so as to define a generally vertically disposed channel in which the printing devices may be disposed in an upright position, and between the two plates 157 and 158, means are provided which afford a bottom wall or support for the printing devices during their advancing movements. Such means include horizontally shiftable gates G–1, G–2 and G–3 that are disposed respectively in positions over the collecting drawers K–1, K–2 and K–3. These three gates are generally similar in form and mounting and, as shown in Fig. 20 of the drawings, the gate G–3 is disposed in a horizontal position so as to project forwardly through a horizontal slot in the rear wall 157 of the guideway 174. Beneath the gate an operating plate 159 is pivoted at its lower edge on a pivot 160, and is associated at its upper edge with the gate G–3 so that the gate may be opened by application of a rearward force to the plate 159.

In respect to the gate G–1, this rearward force is applied through the medium of a solenoid SOL–10 and the gate G–1 is moved to its rearward position when the solenoid is energized.

The gates G–2 and G–3 are arranged for operation by an actuating slide 162 that is mounted for movement in a front to rear direction on a stationary bracket 163, the slide being urged in a forward direction by means including a spring 164, as will hereinafter be described in greater detail. The slide 162 is arranged to be yieldingly connected by springs 165–2 and 165–3 to the gates G–2 and G–3, respectively, so that when the slide 162 is moved rearwardly, a yielding force is applied to both the gates G–2 and G–3, tending to move these gates toward their open positions, and this arrangement is utilized in the present instance so as to enable the gate G–2 to be held in its closed position during those cycles when printing and control devices D are not to be discharged into the drawer K–2, but are to be advanced to position XI for discharge into the drawer K–3. This control operation is accomplished by means including a rock shaft 166 that has a blocking arm 167 afforded thereon so that in one position of the rock shaft 166, the arm 167 will effectually block the opening movement of the gate G–2, while in the other position, the gate G–2 will be permitted to open whenever the actuating slide 162 is moved in a rearward direction.

The pawl carrier 153 is formed in the shape of an angle bar having a downwardly extending flange that rides in a guideway afforded on the rear face of the plate 157 above the level of the gates G–1, G–2 and G–3. The other flange of the carrier extends rearwardly, and the pawls 154 are pivoted on vertical pivots on this horizontal flange of the pawl carrier 153. The pawls 154 are adapted to move into their operative positions through a slot 170 formed in the rear plate 157 at substantially the level of the pawls 154, and such movement is controlled in accordance with the direction of movement of the pawl carrier 153. Thus, a guide plate 171 is mounted on the rear plate 157 by means including screw and spacer devices 172, and this guide plate extends downwardly and has parts that are adapted to be engaged on the rear surface thereof by guide pins 173 on the pawls 154. When the pawls 154 are in their forward or effective positions, the pins 173 are disposed forwardly of the guide plate 171, and as the pawl carrier 153 reaches the right-hand end of its stroke, these pins 173 move past guide springs 174 that are fixed on the guide plate 171. These guide springs 174 then return to positions just to the left of the pins 173 so that when movement of the pawl carrier 153 is reversed so that the pawl carrier moves to the left, these springs 174 are engaged by the pins 173 so as to pivot the pawls 154 toward their rearward or ineffective positions wherein the pins 173 ride along the rear face of the guide plate 171. Then, when the pawls 154 are being moved to the left through their return strokes, such pawls are maintained in their retracted or ineffective position, and when the return movement has been completed, the pins 173 ride off of the ends of the guide surfaces of the plate 171 so as to allow the pawls 154 to return to their effective positions.

The guideway 73 is in the present instance provided with a plurality of spring biased control rollers 177 mounted on the outer plate 158 and extended through clearance spaces afforded in such outer plate so that these rollers will define the limits of the stations IX, X and XI, and maintain the printing devices in the proper positions for discharge downwardly when the appropriate one of the control gates G–1, G–2 or G–3 is open.

The pawl carrier 153 is actuated from the lever arm 152 by means including a connecting link 178 and an overload release mechanism 178R which is effective to prevent injury to the mechanism in the event that a printing and control device D becomes jammed in the guideway 74.

The reciprocating movements of the pawl carrier 153 are utilized in the present instance to impart the desired reciprocating movements to the actuating slide 162. For this purpose a cam 153C is provided on the lower face of the pawl carrier 153, and this cam 153C is adapted to be engaged by a follower arm 180 that is pivoted on the slide 162 on a horizontal axis. This pivot is near the rear end of the pawl 180, and an arm 181 extends downwardly from the rear end of the follower 180 and is connected to the rear end of the spring 164. Thus the spring 164 not only tends to shift the slide 162 in a forward direction, but also tends to pivot the follower 180 in a clockwise direction as viewed in Fig. 20. This, of course, tends to raise the forward end of the follower 180. When the pawl carrier 153 is in its left-hand or raised position, the follower 180 is allowed to assume its upper position wherein the gates G–2 and G–3 are closed. Then, when a right-hand or advancing movement of the pawl carrier 153 is initiated, a cam surface 183 on the right-hand end portion of the pawl carrier 153 engages the forward end of the follower 180 and pivots the same downwardly so that the forward end of the follower 180 is located below the lower surface of the cam 153C. When the pawl carrier 153 reaches its right-hand position, the cam 153C has moved beyond the follower 180, and the follower 180 therefore moves upwardly into engagement with the lower surface of the horizontal flange of the pawl carrier and into position opposite a tapered cam surface on the left-hand end of the cam 153C. Thus, when the movement of the pawl carrier 153 is reversed so that the pawl carrier moves toward the left, this tapered end surface of the cam 153C engages the end of the follower 180 and imparts a rearward movement to the follower 180 and hence to the actuating slide 162. Hence the gates G-2 and G-3 will be yieldingly urged in an opening direction, and both of the gates will open unless the blocking arm 167 is in its blocking position, as will hereinafter be described.

The sensing means

In the operation of the printing machine 41, the printing and control devices D are advanced one by one out of the bottom of the magazine M, and into the sensing station II, as hereinbefore described, and in the last half of the machine cycle, while a printing and control device D is at rest at station II, the control means, such as the control perforations 60 and the tabs 65 and 66, are sensed by a sensing head 200 that is mounted over the guideway 171 for downward movement into sensing cooperation with the identifying means of tabs 65 and the data representations or perforations 60 of each printing device D as this printing device comes to rest at sensing station.

The sensing head 200 comprises a pair of rigidly connected parallel arms 201 and 202 that are disposed over the respective side rails of the guideway 71 just forward of the magazine M, and at their rear ends the arms 201 and 202 are pivotally related to the rails 193 and 194. Such pivotal mounting is afforded by means that are afforded by pivot pins 194', as will be evident in Figs. 8 and 9.

The sensing head 200 is of the same general character as that shown in the co-pending application of Walter T. Gollwitzer, Serial No. 58,742, filed November 6, 1948, now, issued as Patent No. 2,568,064, patented September 18, 1951 to which application reference may be had for further details, and the sensing head 200 is arranged to be moved downwardly from the normally elevated position to a lower or sensing position shown in Fig. 9 in each cycle of operation of the printing device advancing means, as will hereinafter be explained in detail. The means for imparting such downward sensing head 200 includes a pair of cam plates 210 fixed on opposite ends of a rock shaft 211 that extends through the rails of the guideway 71 as will be evident in Fig. 11 of the drawings. The cams 210 each have a slot 212 formed therein to engage a roller 213 on the adjacent side of the sensing head 200. Such rollers 213 are fixed on opposite ends of a mounting shaft which extends between the arms 201 and 202 and constitutes a part of the structure that maintains these two arms in a rigid relationship. The form of the cam slots 212 is such that when the rock shaft 211 is rocked in a forward or counter-clockwise direction, Fig. 11, the sensing head 200 is moved in a downward direction through the desired sensing structure.

The sensing head 200 is arranged to carry means operable to sense the data representations afforded by the perforations 60 in the printing and control devices D, and for this purpose a plurality of sensing pins 220, Figs. 8 and 9, are provided on the sensing head with one such pin disposed in each index point position at which a perforation 60 may appear. In providing a mounting for such sensing pins 220, the sensing head 200 is provided with a lower mounting plate 221 secured as by screws to the lower edge of the arms 201 and 202 and, as shown in Fig. 9 of the drawings, an upper mounting plate 222 is also afforded which is fixed across the upper edges of the arms 201 and 202 by means of screws as will be evident in Fig. 10. The several sensing pins 220 are mounted and guided in aligned guide perforations formed in the upper and lower mounting plates, and each sensing pin 220 has a lower portion that extends downwardly through the guide perforation in the lower mounting plate 221 and an upper guide portion that extends through the aligned guide perforation in the upper guide plate 222. Near its lower end and the defining boundary between the upper and lower portions of the pin, each pin has a head 220H, and a spring 220S surrounds the portion of the pin so as to act between the head 220H and the upper mounting plate 222 so as to thereby urge the sensing pin downwardly to a lower position that is determined by the engagement of the head 220H with the upper face of the lower mounting plate 221.

When the sensing head 200 is moved downwardly through a sensing stroke, the several sensing pins 220 come into contact with the control cards 61, 62 and 63 at each one of the several index positions at which a data representing perforation 60 may appear. Where a pin 220 does not encounter such a perforation, the further downward movement of the sensing head 200 will result in compression of the spring 220S of that sensing pin. Where, however, a sensing pin 220 is aligned with a data representing perforation 60, the sensing pin 220 will pass through such perforation and the aligned frame perforation 60' and will be effective to actuate switch means that govern the qualifier unit 41.

Thus, as shown in Fig. 9 of the drawings, the associated switch mechanism is provided beneath the area occupied by the sensing pins 220. In affording this structure, a stationary plate 225 is mounted so as to be disposed immediately below the location of the printing and control device D, and a second plate 226 is supported in downwardly spaced and parallel relation by means including space sleeves 227 and bolts 228. In downwardly spaced relation from the plate 226, an insulating plate 230 is mounted in parallel relation to the plate 226 by means including the bolts 228 and additional spacer sleeves 231. The insulating plate 230 serves as a support and mounting for a plurality of stationary switch contacts 235 from which individual wires 236 may be extended to the qualifier unit 41, as will hereinafter be described.

The stationary contacts 235 are arranged so as to be respectively aligned with the several sensing pins 220 when the sensing head 200 is in its lower or sensing position, and the movable contact means for cooperation with the stationary contacts 235 are disposed in the space between the upper ends of the stationary contacts 235 and the upper surface of the plate 225. Thus a plurality of spring plungers 238 are guided along vertical paths by the plates 225 and 226, and these plungers are arranged so as to be in alignment with the respective stationary contacts 235. Each plunger 238 has a head 238H at its upper end that is guided in an appropriate vertical bore in the plate 225, while the lower end of each plunger is extended through and guided by an appropriate opening in the plate 226. Just beneath the plate 225, a relatively thin stop plate 239 is afforded, and the uppermost position of each plunger 238 is defined by engagement of the upper end of an enlarged portion 238E of the pin with the lower surface of the stop plate 239. When the plunger is in this position, the upper end of its head 238H will be disposed in the plane of the upper surface of the plate 235. The respective plungers 238 are urged upwardly by springs 238S which surround the plungers between the enlarged portions 238E and the upper face of the plate 226. The plungers 238 thus constitute movable switch contacts which are electrically grounded through their sliding engagement with the plates 225 and 226, and when a control perforation 60 in a printing and control device D is sensed by one of the pins 220, this pin 220 forces the aligned plunger 238 downwardly so that the lower end of the plunger engages the aligned stationary switch contact 235, and it is such selective circuit closure that is effective to control the qualifier unit 41, as described in our aforesaid parent application.

The sensing head 200 also embodies means for sensing the identifying tabs 65 and 66 of the printing devices D, and this means includes a plurality of sensing pins 240 that may be extended downwardly through openings formed respectively in the guide plates 222 and 221 as described in the aforesaid Gollwitzer application. The sensing pins 240 have heads 240H at their upper ends that rest on the upper surface of the plate 222, and in a downward sensing stroke of the sensing head 200, the pins 240 may encounter a tab 65 or 66 on a printing device D that is disposed in sensing position. It will be observed in Figs. 9 and 10 of the drawings that two sensing pins 240 are provided so that they are spaced in a front to rear direction, and this is done so that these pins may be utilized for cooperation with what are termed notched tabs, or with perforated tabs 65 which may have four and sometimes five perforations in each tab. This use of perforated tabs serves to increase the number of classifications that may be imparted to the printing devices through the use of tabs on such printing devices, but it will be observed that these pins 240 may be utilized with either perforated solid or notched tabs as is well understood in the art. When a sensing pin 240 engages a tab 65 or 66, or an unperforated area of such a tab, the continued downward movement of the sensing head serves in effect to cause relative upward movement of the sensing pin, and this relative upward movement is utilized to impart controlling movement to means that are mounted on the sensing head 200. Thus the sensing head 200 has a transverse mounting shaft 242 fixed thereon as will be evident in Figs. 8 and 9, and on this shaft 242 a rocker 245 is mounted so as to extend rearwardly.

The rocker 245 is in the form of a plate having a downturned edge flange 246R at its rear end edge. The flange 246R, at the lower edge thereof, has a forwardly projecting horizontal flange 250 which overlies the heads 240H of the pins 240. Thus, when one of the pins 240 engages a tab, the continued rocking movement of the sensing head 200 causes the rocker 245 to be rocked in a counter-clockwise direction about the pivot afforded by the shaft 242. In other words, the rear or right-hand edge of the rocker 245 is in effect elevated when a tab 65 or 66 is thus sensed, and this relative rocking movement of the rocker 245 is utilized in causing the print-skip control of the printing machine in the same general manner described in the aforesaid Gollwitzer Patent No. 2,568,064.

It has been pointed out hereinbefore that the relative rocking movement of the rocker 245 on and with respect to the sensing head 200 is utilized to control the selector mechanism of the machine, and this is accomplished through the medium of a rearwardly extending transmitting arm 260, Fig. 8, the rear end of the arm 260 being operatively associated with a downwardly extending link, as described in said Gollwitzer Patent No. 2,568,064, that is connected to the movable member of a selector switch 265, Fig. 38. The rocker 245 is restored to its normal position when the sensing head is elevated, and this is accomplished by a resilient leaf spring abutment as described in said Gollwitzer Patent No. 2,568,064.

The sensing head 200 also includes means operable when a tab 65 is sensed in either one of two particular positions on the printing device D by a long or special purpose sensing pin, to produce a particular controlling operation, and for this purpose a pair of switches TS-7 and TS-8 are mounted on a bracket 267 over the guideway 71 and just forwardly of the sensing head 200. For this purpose a pair of forwardly extending levers 268-1 and 268-2 are carried on the sensing head 200 so that the forward end of the levers 268-1 and 268-2 are disposed over the operating elements of the respective switches S-12 and S-13. The levers 268-1 and 268-2 are carried on the transverse pivot shaft 242, and these levers have arms that extend rearwardly into a position wherein they will overlie the upper ends of long or special purpose sensing pins 240 disposed in a particular location on the sensing head 200. At this point, the flange 250 is cut away so that the arms are in position for direct cooperation with the related sensing pin or pins 240. Thus, when such a particular tab 65 is sensed, the related lever 268-1 or 268-2 will be forced to move or rock in a counter-clockwise direction as the sensing operation proceeds, and when this occurs the end of the lever 268-1 or 268-2 will be effective to actuate the operating element of the related control switch. When such a tab is not sensed, the arm 268-1 or 268-2 may strike the operating element of the related switch, but the lever at this time may rock freely and sufficient force will not be transmitted to the switch to actuate the same.

In the operation of the sensing head 200 it is, of course, essential that the printing devices be accurately located at the sensing station, and this same requirement is presented at sensing station II and at printing station VII. Thus, at printing station VII, a positioning pawl 275A is provided which is operated in proper timed relation by means including a rocker 276, as described in the aforesaid Hueber Patent No. 2,359,850. At the sensing station II and the punching station III, locating pawls 275 and 275X, respectively, are provided, Figs. 8 and 11, and these two locating pawls are operated in proper timed relation to the printing device feeding means in the same manner as in the aforesaid Gollwitzer Patent No. 2,568,064.

As described in said Gollwitzer Patent No. 2,568,064, the pawls 275 and 275X tend to assume their effective positions, and are moved outwardly at the proper times in the cycle by a cam bar 285, Fig. 10, that is slidably mounted along the adjacent outer face of the guideway 71.

The operation of the positioning pawl 275 is so arranged that it actuates a safety switch S-3 that is secured to the guideway just forwardly of the free end of the pawl 275. This switch includes an operating arm 297, and the relationship between the pawl 275 and the operating arm 297 is such that when the tooth 275T sits in the notch N of a printing device, the switch S-3 will be closed, but in the event that there is no printing device D positioned at the sensing station, the added inward movement of the pawl 275 causes the switch S-3 to be moved to an open relationship. The switch S-3 is included in a safety circuit as described in said parent application.

*The operation of the sensing head*

The sensing head 200 is operated in timed relationship to the printing device advancing means, and this relationship is such that the sensing head is maintained in its upper position of Fig. 10 during the first half of the machine cycle, it being during this period that the advancing movement of the printing devices takes place. Then, during the last half of the cycle, and at the time when the printing operation is being performed upon the printing device that is located at the printing station, the sensing head 200 is moved downwardly through a sensing stroke and is then allowed to return to its upper or retracted position. In accomplishing this operation of the sensing head 200, an operating link 300, Fig. 10, is pivoted at 301 on a plate 302 that is secured to the right-hand one of the operating cams 210. A spring 303 anchored on the guideway 71 extends downwardly along the link 300, and at its other end is attached to the link 300 so as to normally urge the link 300 in an upward and rearward direction, and this in turn serves to normally locate the cams 210 in their most clockwise position as shown in Fig. 10 of the drawings. The link 300 extends downwardly and forwardly and at its lower end is formed to cooperate, through a suitable cam roller, with a cam 305 that is being fixed on a rotatable sleeve 306. This rotatable sleeve is carried on an extension of the shaft 100, which forms an element of the printing device feeding means, and the sleeve is rotatable through indexing movements on and with respect to this extension of the shaft 100 as described in said Gollwitzer application. The cam roller 307 is so mounted on the link 300 that it is arranged to engage the edge of the cam 305. This cam 305 may be termed a modified form of star cam and has six lobes at equally spaced points about the edge thereof. Thus whenever the cam 305 is rotated through an indexing movement of 60°, the link 300 will be drawn downwardly by one of the lobes and will then be allowed to return to its upper position, and it might be pointed out that the indexing movements of the cam 305 are terminated when the cam roller 307 engages the low space between two of the lobes.

The sleeve 306 that carries the cam 305 is arranged to be actuated through such an indexing movement each time the printing device advancing means are operated, and this indexing movement takes place during the last half of the cycle of operation of such printing device advancing means. Thus, as shown in Fig. 11 of the drawings, the sleeve 306 has a toothed ratchet wheel 308 fixed thereon at a point adjacent to the rocker arm 134, and this toothed ratchet wheel has six teeth so as to correspond with the number of lobes of the cam 305. A pawl 309 carried on the rocker arm 134 extends downwardly, and the lower end thereof is arranged to ride against the rear face of the ratchet wheel 308. Thus, when the rocker arm 134 is moving in a forward direction during the first half of an operating cycle thereof, the pawl 309 rides freely over the teeth of the ratchet wheel 308. When, however, the movement of the rocker arm 134 is reversed in the last half of the machine cycle, the pawl 309 engages one of the teeth of the ratchet wheel 310 and imparts the desired 60° indexing movement to the sleeve 306, and it might be pointed out that this indexing movement is in the direction indicated by an arrow in Fig. 11 of the drawings. In order to prevent overthrow of the sleeve 306 and the operating elements associated therewith, a conventional friction brake 312 is associated therewith, and this friction brake may be tightened as described in said Gollwitzer Patent No. 2,568,064 so as to insure proper actuation of the sleeve 306.

*The storage mechanism*

In the present machine, the sensing operation of the sensing head 200 takes place, of course, when a particular printing and control device D is located at sensing station II, and in accordance with the sensing operation and the setting of the selector mechanism associated with the selector switch 265, and in accordance with the operation and setting qualifier unit 41, certain control operations must be performed on or with respect to such printing and control device D when it reaches several successive stations along the printing device guideway. Thus, in respect to a particular printing and control device, there may be a recording operation performed at station III and at station IV, a print-skip control may be formed at station VII, and fiinally, the printing and control device may be directed into the cull drawer K–1 at station IX or selectively into the drawers K–2 or K–3 at stations X and XI.

In order to enable such delayed control operations to be performed in response to the operation of the sensing and qualifying means, the present machine includes four storage drums that are identified as drums 315A, 315B, 315C and 315D. In their structure, these storage drums are quite similar to the storage drums 315 and 315A, described in the aforesaid Gollwitzer Patent No. 2,568,064, and reference may be had to such patent for details of physical structure of such storage drums.

In the present instance, the storage drums 315A and 315B are mounted in a fixed relation on the indexing sleeve 306, as will be evident in Fig. 16B of the drawings, and these storage drums 315A and 315B each have six stations defined thereon by storage pins 318A and 318B, respectively. The six stations about the two drums 315A and 315B are diagrammatically illustrated in Fig. 11 of the drawings, and it will be noted in these two views that the several stations have been identified by Roman numerals as stations I to VI. The station II on each drum constitutes the set-up station of the drum, and this allocation of stations about the two storage drums 315A and 315B is arranged to correspond with the identification of the first six stations along the printing device guideway. Thus, when a particular printing device D is in sensing station II along the printing device guideway, the result of the operation of the sensing head 200 and the qualifier unit, as well as the selector switch 265, is represented by an appropriate setting of the sensing pin 318A or 318B that is located at station II on the related drum. It should be observed that the set-up means in the present instance for drums 315A and 315B corresponds exactly with the set-up means illustrated in the aforesaid Gollwitzer Patent No. 2,568,064, and such set-up means include a solenoid SOL–2 for setting up the drum 315A, and a solenoid SOL–3 for setting up the drum 315B in the manner shown and described in said Gollwitzer patent.

After a pin 318A or 318B has been set up at station II, it accomplishes its controlling functions in predetermined succeeding machine cycles, as described in our aforesaid parent application.

Now, with respect to the storage drums 315C and 315D, it may be noted that these drums are located just to the right of the right-hand end of the printing device guideway 74, as will be evident in Fig. 13 of the drawings, and the drums 315C and 315D are fixed on opposite ends of a mounting sleeve 306–2, which is in turn mounted on a horizontal shaft 320. The storage drums 315C and 315D are diagrammatically illustrated in Figs. 15 and 16 of the drawings, and it will be observed that these two storage drums have twelve equally spaced storage pins 318C and 318D mounted therein, in substantially the same manner as the pins are mounted in the storage drums. Thus, the storage drums 315C and 315D must be indexed through 30° indexing movements, and this is accomplished through the provision of a 12-tooth ratchet wheel 322 on the left-hand end of the sleeve 306–2. Adjacent to the ratchet wheel 322, a pawl carrying rocker 324 is mounted on the shaft 320 so as to extend in a generally vertical direction. This rocker 324 carries a spring biased pawl 325 which is adapted to engage the ratchet wheel 322 when the rocker 324 is moved in a clockwise direction. The rocker 324 is urged in such clockwise direction by a spring 326. The ratchet wheel 322 is held against reverse movement by a retaining pawl 327, which is of course, spring biased toward its effective position, as indicated in Fig. 15 of the drawings.

Means are afforded whereby the storage drums 315C and 315D are operated in timed relation to the operation of the printing device advancing means, and for this purpose an operating link 328 is extended downwardly and forwardly from the upper end of the rocker 141, and at its forward end this link 328 is connected by a pin and slot connection 329 to the lower end of the rocking lever 324. Hence, it will be clear that the storage drums 315C and 315D will be operated in a clockwise direction through a 30° indexing movement each time and at the same time that the drums 315A and 315B are being operated through their 60° indexing movements.

The storage drums 315C and 315D are arranged to accomplish their controlling functions in predetermined cycles after the sensing operation and when the related printing and control device D has reached a particular one of the stations along the printing device guideway. Thus, it will be observed that the various stations about the storage drums 315C and 315D have been indicated by Roman numerals from I to XII, and in this connection it should be observed that the set-up position is different in respect to the two drums 315C and 315D. Thus, with respect to the storage drum 315C, the set-up station II is located in the second position to the left of the uppermost position, and at this position, as shown in Fig. 13 of the drawings, a solenoid SOL-4 is mounted so that when the solenoid is energized, the aligned storage pin 318C that is located at station II will be moved to a set position.

With respect to the storage drum 315D, the set-up position is illustrated in Fig. 16 as being the first station to the right of the uppermost location of the drum, and as shown in Fig. 13 of the drawings, a set-up solenoid SOL-5 is mounted opposite this position so that when the solenoid SOL-5 is energized, the aligned storage pin 318D that is located in station II of this drum will be moved to its set-up or effective position. It will be recognized, of course, that in each instance restoring means of the cam type are provided so that the storage pins will be restored to their idle positions before they again reach the set-up station II of the drum in which they are mounted.

The cull-control mechanism

The storage drum 315D is arranged to govern the operation of the solenoid SOL-12 of the cull-control gate G-1, and for this purpose a switch S-6 is arranged with an operating plunger 436, Fig. 16, so that whenever this plunger 436 is pushed in a forward direction, the switch TS-6 will be closed. The plunger 436 is arranged to be engaged and forwardly actuated by a set pin 318D as such pin moves between stations IX and X of the drum. The switch TS-6 is closed at substantially the time when the pin moves into station IX and is allowed to open just before this pin moves into station X, and in the cycle in which the pin is moved from station IX to station X, the circuit that is conditioned by closure of the switch TS-6 is closed by the timing switch that is associated with the gate-operating slide 162 so that this last mentioned switch serves as a timing switch in this circuit.

The drawer drop control

The storage drum 315C is utilized in the present instance to govern the alternate use of the collecting drawers K-2 and K-3, and for this purpose, a follower arm 440 is pivoted on a shaft 441, Fig. 15, so as to extend forwardly beneath the rear portion of the storage drum 315C. On this follower arm 440, a tooth 440T is provided so that when the set pin moves from station X to station XI the follower arm 440 will be rocked in a downward direction and then released for upward movement just prior to the time when the pin reaches station XI. This downward rocking movement of the follower arm 440 is utilized to impart an advancing or indexing movement to a control shaft 445. In accomplishing this, the shaft 445 has a ratchet wheel 446 fixed thereon, and a relatively long pawl 447 extends downwardly from the forward end of the follower arm 440, and has a tooth 447T thereon for engaging the ratchet wheel 446. This pawl 447 is thus operable to advance the control shaft 445 through an angular increment identified as "X" in Fig. 15 of the drawings. Such indexing movements of the shaft 445 are utilized to control the rocking movements of the shaft 166, and they are also utilized to govern the operation of a pair of reversing switches S-3 and S-4 which, among other things, govern the indicating lights associated with the drawers K-2 and K-3, and also govern the conditioning circuits for controlling the dropping of the drawer that is completely filled.

Thus, it will be observed that the shaft 445 has a cam 448 thereon which has alternate high and low portions 448L and 448H. At its forward edge, the cam 448 is adapted to be engaged by a roller 449 that is fixed on an arm 450 on the shaft 166. A spring 451 acts on the arm 450 to hold the roller 449 in engagement with the cam 448, and hence, as the control shaft 445 is advanced, the shaft 166 will be rocked between two positions, in one of which the blocking arm 167 is in position to block movement of the gate G-2, and in the other of with the arm 167 is in a lower or ineffective position so that the gate G-2 may operate when the slide 162 is moved rearwardly.

On the rear side of the cam 148, a roller 452 is mounted on an arm 453 that is pivoted at 454. A spring 455 holds the roller 452 in engagement with the cam 448, and it should be observed that when one of the rollers 449 and 452 is located in a low portion of the cam, the other roller will be located on a high portion of the cam, and thus one or the other of these rollers acts as a detent to hold the control shaft 445 in the position to which it has been moved by the pawl 447. The arm 453 is effective to operate the reversing switches S-3 and S-4 so that these switches may obtain the reversing functions in respect to indicating lights L-2 and L-3.

The drawer mounting

All of the drawers or collectors K-1, K-2 and K-3 are similarly mounted on shelves 460 that are pivoted at 461 on brackets 462. When a drawer is in position on one of the shelves 460, the shelf may be pivoted at the pivot 461 to the upper position shown in Fig. 23, and when this is done, the drawer is held in such upper position by engagement of a detent 463 with a stud 464 that is afforded on the bracket 462. An operating handle 465 mounted beneath the forward end of the shelf 460 has a rearwardly extending rod 466 thereon so that an operator may manually push the rod 466 rearwardly to operate the pawl 463, thereby to permit the shelf 460 to drop downwardly at its forward end. Thus, it will be observed that the pawl 463 is pivoted at 467 on the lower portion of the shelf 460, and has a spring 468 urging the pawl to an effective position. When the rod 466 is pushed rearwardly, a lower push rod 466L engages the lower end portion of the pawl 463 to pivot the lower end in a rearward direction, thereby to release the shelf for downward movement. Such downward movement takes place by gravity, and it may be observed that means, such as a dash pot 470, may be associated with the rear end portion of the shelf to cushion the shock that might be caused by excessive weight in the forward portion of the drawer carried on the shelf.

Figure 23:
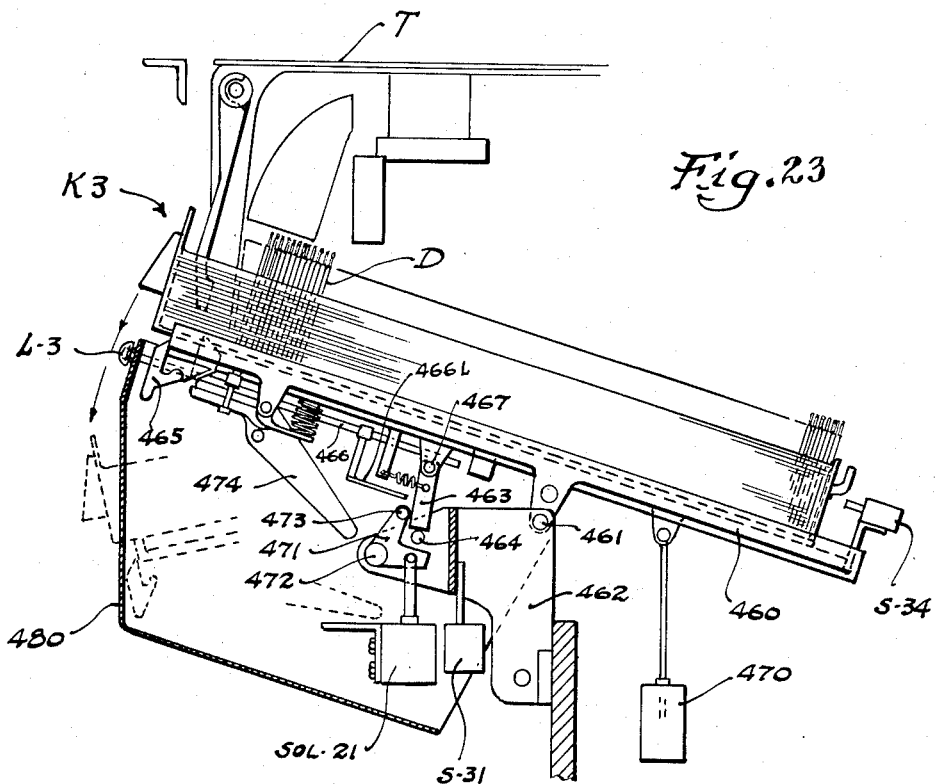
Fig. 23 is a vertical sectional view showing the drawer drop control means.

The mechanism shown in Fig. 23 of the drawings also provides for an automatic release of the latch pawl 463. To accomplish this, a bell crank 471 is pivoted at 472 on the bracket 462, and a roller 473 on one arm of the bell crank is arranged to engage the forward face of the latch pawl 463. Thus, by rocking the bell crank 471 in a clockwise direction, the latch pawl 463 may be released and the drawer caused to drop. Electrically operated means are afforded for operating such bell crank 471, and with respect to the drawer K-3, a solenoid SOL-21 is provided having the armature thereof operatively connected to the other arm of the bell crank 471. With respect to the drawer K-3, the mechanism is the same, and a similar solenoid SOL-20, Fig. 24, is provided. On the bracket 462, a switch S-31 is provided in association with the drawer K-3, and the pawl 463 is arranged to engage and open the switch S-31 when the drawer has been dropped, or, in other words, when the shelf has moved downwardly in response to a release of the latch pawl 463. In respect to the drawer K-3, a similar switch S-30 is provided in this relationship, and in respect to the drawer K-1, a similar switch S-29 is provided for the same purpose.

On the rear portion of the shelf 460, means are afforded to provide an indication on when the drawer on the shelf has been completely loaded. This is accomplished by the follower on such drawer when the follower moves to this most rearward position, and, as shown in Fig. 23, a switch S–34 is associated with the drawer K–3. A similar switch is provided in association with the drawer K–2, while in respect to the drawer K–1, a reversing switch S–32 is mounted in this position, as described in greater detail in my aforesaid parent application.

The mechanism including the latch pawl 463 and the solenoid SOL–21 is, in each instance, enclosed with a protective housing 480, and, as shown in Fig. 23, and also in Fig. 1, an indicating light is provided at the forward end of each one of these enclosing housings, such lights being indicated by the reference characters L–1, L–2 and L–3 in respect to the drawers K–1, K–2 and K–3, and being mounted on the forward ends of the respective rods 466 so as to serve also as manual actuating buttons for these rods.

*The timing switches*

The main drive shaft of the machine is utilized to operate timing switches TS1, TS–2, TS–3, TS–4 and TS–5, Fig. 24, that are mounted over the main shaft, and for the purpose of operating these timing switches, a plurality of cams are fixed on the main drive shaft and are arranged to close the timing switches as described in our parent application.

*Control circuits in the unit 40*

The control circuits in the unit 40 take their power from a terminal block 600 through a main off-on switch 601, and when the switch 601 is closed, the driving motor 84 is energized through connections 602 as shown in Fig. 24 of the drawings. When the switch 602 is closed, circuit is extended through a wire 604 to a main bus bar 605 that is shown at the right-hand side in Fig. 24 of the drawings. Similarly, wires 606 in parallel extend from the other side of the switch 602 to another bus bar 607 that is shown at the left-hand side of Fig. 24, and the various control circuits are afforded between the bus bars 605 and 607.

Thus, as described in said parent application, the main clutch of the machine is caused to engage by energizing the solenoid 91M, and when this is to be done, a start-stop control handle 608 is operated to close a normally open start switch 609. The handle 608 may also be utilized to open a normally closed stop switch 610 that is included in what may be termed the running or safety circuit of the machine, as will hereinafter be described. This running or safety circuit is also arranged to include the switch S–40, which is closed by the stop lever 91S when this stop lever moves to its released position, and this is effective, as will hereinafter be described, to afford a shunt circuit around the start switch 609. Thus, it will be noted that wires 611 and 612 in series extend from the bus bar 607 to one terminal of the solenoid 91M, and means including a wire 613 are extended from the other terminal of the solenoid 91M to a normally closed switch S–7 that is arranged in association with the arm 152 so as to be opened in the event that the overload release mechanism 178R becomes released, as would be the case in the event that the printing devices jammed in the distributing guideway 74 of the machine. From the other terminal of the switch S–7, a wire 614 extends to one contact of a plug and socket connector 615, and from this contact the circuit is extended through the switch S–34, which constitutes the overload or full-load switch of the drawer K–3. From the other side of the switch S–34, the circuit is extended by a wire 616 to one contact of a plug and socket connector 616 through which the circuit is extended to the switch S–33, which constitutes the full load switch of the drawer K–2. From the other side of this switch, the circuit is extended by a wire 617 to a plug and socket connector 618 so as to be extended through the switch S–29, which is the switch that is opened when the cull drawer K–1 is in its down or ineffective position.

Before proceeding further with the aforesaid starting circuit, it should be pointed out that the switches 30 and 31 are connected so that the starting circuit will be broken if both of the drawers K–2 and K–3 are in their lower positions. Thus, the switch 34 has one connection through the switch 30 to the switch 33, while the switch 33 has an alternate connection back to the switch 34 through the switch 31. Thus, if one or the other of the drawers K–2 or K–3 is in its upper position, the circuit will be extended through the switches 33 and 34 and one of the switches 30 or 31 to the switch 29, and thence the circuit is extended through the plug connector 618 and a wire 619 through a plug or jack connection 620 that may be utilized in association with a special control switch fitting. The switches of the jack 620 are normally closed when a plug is not in position therein, and circuit is thus extended through the switches of the jack 620 and a wire 621 to one contact of a normally closed switch S–14 that is located in a conventional manner adjacent the magazine M so as to be opened when the supply of printing and control devices has been exhausted. A wire 622 extends from the other side of the switch S–14, and in series through a wire 623 to one contact of the normally open starting switch 609. The contact of the switch 609 is connected by a wire 624 to one contact of the normally closed stop switch, and a wire 625 from the other contact of the stop switch extends back to the plug 618 through which it is connected to the normally closed contact of the reversing switch S–32, the common contact of this switch being connected through the plug 618 and a wire 626 to a junction plate 627. From the junction plate 627, a wire 628 extends to the upper right stationary contact of a control switch 630, which constitutes a control for the numbering machines. When the switch 630 has the control element thereof in its upper position, circuit is extended from the wire 638 through a wire 631 to the line wire 605. Thus, when the starting switch 609 is closed, the solenoid 91M will be energized, thereby to cause the main clutch 91 of the machine to be engaged, and when this occurs, the switch S–40 will be closed.

This closure of the switch S–40 serves, when the machine is set for automatic operation, to afford a shunt circuit around the starting switch 609. The machine is set for such automatic operation by a control switch 633 of the double throw type. When the switch 633 is set in its upper position, the machine is conditioned for automatic operation, and the left-hand movable element of the switch member is connected by a wire 635 to one contact of the switch S–40. The upper left stationary contact of the switch 633 is connected by a wire 635A to the wire 622. The other contact of the switch S–40 is connected by a wire 636 and a wire 637 in series to the wire 624, and this affords the desired shunt connection around the starting switch 609 and enables the control circuit to be broken by opening of the stop switch 610.

A similar starting action may be attained by connecting suitable switch means into a jack 650 that has its opposite contacts connected by wires 651 and 652 to the wires 637 and 622, respectively.

The solenoids 92M and 93M may be energized to disengage the plate feed and platen clutches, respectively, and for this purpose, connecting jacks 653 and 654 are provided. The wire 607, and a branch 611B extends circuit to one contact of the solenoid 93M. Wires 655 and 656 extend, respectively, from the other terminals of the solenoids 92M and 93M to one of the contacts of each of the related jacks 653 and 654, and a wire 657 extends from the common contacts of the two jacks to the lower right-hand stationary contact of the switch 633. A wire 658 extends from the right-hand movable contact of the switch 633 to the wire 605, so that when the switch 633 is set in its lower or manual position the solenoids 92M and 93M are conditioned for use under control of switch means associated with the jacks 653 and 654. The upper position of the switch 633, is, of course, the position required for automatic operation of the machine.

*The controlling action of the storage drum 315A*

While the operation of the storage drums 315A and 315B are not of particular importance insofar as the present invention is concerned, the electrical connections utilized in respect to these drums are so inter-related to the electrical system that all of such connections will be described in a general way.

Thus such automatic operation of the machine the set storage pins 318A in the drum 315A serve, of course, to mechanically actuate a punching means in the machine, as described in said parent application, and such pins also serve to cause the desired print-skip operation of the platen P.

The set pins 318A in the storage drum 315A also serve to govern the operation of a tab shifting means and this is accomplished electrically by the circuit shown in Fig. 24. Thus, the control solenoid SOL–6 has one terminal connected by a wire 660 to the line wire 607. The other terminal of the solenoid SOL–6 is connected by a wire 661 to one contact of an off-on switch S–20, the other contact of which is connected by a wire 662 to one contact of the switch S–10, this last switch being the one that is closed as hereinbefore described by the set pins 318A. The other contact of the switch S–10 is connected by a wire 663 to one contact of the timing switch TS–4, the other contact of which is connected by a wire 665 to the line wire 605.

*Controlling circuits from the storage drum 315B*

The set pins 318B in the drum 315B serve primarily to govern numbering machine control solenoids SOL–1 and SOL–11, and in this action the switch TS–5 serves as a timing switch. Thus, one contact of the switch TS–5 is connected by a wire 670 to the line wire 607, the other contact of this switch being connected by a wire 671 to the upper left stationary contact of the off-on switch 630, the left-hand movable contact of which is connected by a wire 673 and a branch 674 to one terminal of the respective solenoids SOL–11 and SOL–1. The other contact of the solenoid SOL–1 is connected by a wire 675 to one contact of the switch S–2, while the other terminal of the solenoid SOL–11 is connected by a wire 676 to the normally open stationary contact of the switch S–1. The movable contact of the switch S–1 is normally engaged with a second stationary contact of the switch S–1, and this second stationary contact is connected to the terminal block 627. The common contact of the switch S–1 and the other contact of the switch S–2 are connected to the line wire 605 by a wire 677. Thus, when the switch 630 is in its upper closed position, the closure of the switch S–2 will cause the numbering machines to be operated to cause impressions to be made therefrom, and the subsequent closure of the switch S–1 to the normally open contact thereof by the pin 318B serves to cause the numbering machines to be reset in the next cycle.

The switch 630 serves in its open position to change the function of the storage drum 315B. Thus, when this switch is in its open position, the normally closed contacts of the switch S–1 serve to replace the wires 628 and 631 in the running circuit of the machine, and when a pin 318B actuates the switch S–1, this running circuit is broken and the solenoid 91M is deenergized, thereby to stop the machine.

*Controlling action of the drum 315C*

The set pins 318C in the drum 315C serve as hereinbefore described to reverse the position of the gate stop arm 167, to reverse the switches S–3 and S–4, and to close the switch S–5. The switch S–4 serves to control energization of the solenoids SOL–20 and SOL–21, while the switch S–3 serves to control and alternately energize the indicating lights L–2 and L–3. Thus, the common contacts of the switches S–3 and S–4 are connected by a wire 680 to the line wire 605, while stationary contacts of the switch S–4 are connected, respectively, through the plugs 615 and 616 to one terminal of the respective solenoids SOL–21 and SOL–20. The other terminals of the solenoids SOL–21 and SOL–20 are connected through the respective plugs 615 and 616 and a common lead wire 682 to one contact of the switch S–5, the other contact of which is connected by a wire 683 to the line wire 607.

Similarly, the stationary contacts of the switch S–3 are connected, respectively, through the plugs 615 and 616 to the terminal of each of the respective indicating lights L–3 and L–2, the other terminals of such lights being connected through such plugs and a common lead wire 685 to the line wire 607.

It should be noted here that the light L–1 serves merely to indicate the reason why the machine has stopped when filling of the cull drawer K–1 has reversed the switch S–32. Thus, one terminal of the light L–1 is connected by means including the wire 685 to the line wire 607, and within the plug 618, the other terminal of the light L–1 is connected to the normally open stationary contact of the switch S–32. Thus, when actuation of the switch S–32 engages the movable contact with this stationary contact, the circuit is completed through the wire 626 and the extensions thereof, as hereinbefore described, to the line wire 605, thereby to energize the light L–1.

*Controlling action of the drum 315D*

In a culling run of the machine, the drawer changing and dropping action of the storage drum 315C takes place in the same manner as in regular runs of the machine, but the drum 315A is not used and hence no printing takes place. In such a culling run, however, the drum 315D governs the gate G–1 so as to drop predetermined or selected printing devices D into the cull drawer K–1. Thus, the gate operating solenoid SOL–12 has one terminal connected by a wire 690 to the line wire 607, and from the other terminal of the solenoid SOL–12, the switches S–8 and S–6 are connected in series to a wire 691 which extends to the wire 680, and thus to the line wire 605. Thus, when a set pin 318D in the drum 315D closes the conditioning switch S–6, the subsequent closure of the timing switch S–8 by the gate operator 162 in the next machine cycle, completes the energizing circuit for the solenoid SOL–12. This causes the related printing device to be dropped by the gate G–1 into the cull drawer K–1.

*The set-up of the storage drum 315C*

The storage drum 315C serves, as hereinbefore described, to govern the changing of the collecting drawers K–2 and K–3, and in accomplishing this result, it is desired that each drawer shall receive the same group of printing and control devices D that have been removed from this drawer and placed in the magazine M. To enable this to be done, a tab 65 is placed in a selected identifying position on the last printing and control device D that is included in a particular storage drawer. When this last printing device reaches sensing station II, the aforesaid tab is sensed by a long sensing pin, which is arranged to cooperate with the rear end of the arm 268 that is associated with the switch TS–7. Hence, the switch TS–7 will be closed, and this is arranged to energize the set-up solenoid SOL–4 that is associated with the storage drum 315C. Thus, it will be observed that a wire 700 extends from the line wire 605 to one contact of the switch TS–6, and a wire 701 extends this circuit to one contact of the switch TS–7. A wire 702 from the other contact of the switch extends to one terminal of the solenoid SOL–4, while a wire 704 extends from the other terminal of this solenoid to the line wire 607. Hence, it will be clear that closure of the switch TS–7 will energize the solenoid SOL–4, thereby to set a pin 318C so that the controlling operation in respect to the drawers K–2 and K–3 will be attained at the proper time as hereinbefore described.

The set-up of the storage drum 315A

In attaining controlled set-up of the drum 315A, a timing relay R–2 is utilized so as to be operated each time a pin 318A is to be actuated to set position, while in certain cycles where a pin 318B is to be set, a similar relay R–1 is operated in a controlling relation as will hereinafter be described. Each of the relays R–1 and R–2 has its operating coil disposed between its plug terminals 7 and 8, while in each case, such relays have stationary contacts 1 and 3 between which contact 2 may be actuated from normal engagement with contact 1 to engagement with contact 3. Similarly, each relay has contacts 4 and 6 between which contact 5 may be actuated from normal engagement with contact 4 to engage contact 6.

The timing relay R–2 is arranged to energize the solenoid SOL–2 when contacts 5 and 6 thereof are engaged due to operation of the relay R–2. Thus, a wire 715 extends to one terminal of the solenoid SOL–2, and from the other terminal a wire 716 extends to one contact of an off-on switch 717 which may be opened when operation of the platen is not desired. Circuit is extended from the other contact of the switch 717 to the No. 6 contact of the relay R–2, by a wire 718, and from the No. 5 contact thereof, wires 719 and 719A in series extend to a terminal block 720. From this terminal block 720 circuit is extended by a wire 721, the switch S–15 and a wire 722 to the line wire 605. The switch S–15 constitutes a control switch that is held open when the carrier bars of the guideway 71 are in their rear or home positions, and thus switch S–15 is effective to prevent counting and similar functions in the second printing cycles of duplicate printing operations.

The operating circuits for energizing the relay R–2 are afforded in part by a wire 723 extended from the lead wire 607 to one contact of the safety switch S–3 which is open when a printing device D has not been moved into sensing station II. A wire 724 extends from the other contact of the switch S–3 to a terminal 725, from which a wire 726 extends to the No. 7 terminal of the relay R–2. The operating coil of the relay is disposed between the 7 and 8 terminals, and from the No. 8 terminal a wire 727 extends to a terminal block 730. When the timing relay is to be energized, circuit is extended from the terminal block 730 to the line wire 605 by operation of the selector switch 265, the qualifier unit 41, or by operation of the relay R–1, as will be hereinafter described.

The set-up of the storage drum 315B

The storage drum 315B is utilized to control printing from and re-setting of the numbering mechanisms of the machine, and this numbering operation is used where the number of impressions in a particular group is to be printed from a special printing device that follows the last printing device of such group, with the last impression in such group. This expedient is commonly used in mailing operations where the special printing device that follows a group constitutes a town marker addressed to a particular city or area. Such town marker printing device has a tab 65 thereon in a particular position. Such a tab is sensed by a long sensing pin which operates the one of the arms 268 that is associated with the switch TS–6, and thus the switch TS–6 is closed when such a tab is sensed. It will be recalled that one contact of the switch TS–6 is connected by the wire 700 to the line wire 605, while a wire 735 extends from the other contact of this switch to one end of the operating coil of the relay R–1. The other end of the coil of the relay R–1 is connected by a wire 736 to the line wire 607 so that when the switch TS–6 is closed, the relay R–1 is operated.

When the relay R–1 is thus operated, the closure of its contacts 2 and 3 serves to complete circuit to the solenoid SOL–3 so as to thereby effect setting of a pin 318B in the drum 315B. Thus, the contact 2 is connected by a wire 738 to the line wire 605, while a wire 739 connects the contact 3 to one terminal of the solenoid SOL–3, the other terminal of the solenoid SOL–3 being connected by a wire 740 and the wire 715 to the line wire 607.

When a pin 318B is thus set to cause operation of the numbering machines, it is, of course, necessary that the platen P be caused to operate in the related cycle. This is accomplished by placing the relay R–1 in control of the operation of the relay R–2. Thus, circuit is extended between the 2 and 5 contacts of the relay R–1 by a wire 741, and a wire 742 is extended from the No. 6 contact of the relay R–1 to the terminal block 730. Thus, when the relay R–1 is operated, a similar operation of the relay R–2 takes place, and hence the platen will operate when the town marker printing device reaches printing station.

The set-up of the storage drum 315D

The storage drum 315D is, of course, utilized to control operation of the gate G–1 in a culling run of the machine, and in such a run the relay R–2 functions under control of the selector switch or the qualifier unit 41, as will hereinafter be described, to govern the culling operation. In such a culling run, the qualifier and/or the selector switch mechanism serve to determine whether each printing device meets certain predetermined standards or qualifications, and through control of the relay R–2, serves to govern the setting of the pins 318D.

Thus, in a culling run the off-on switch 717 is opened so as to render the relay R–2 ineffective with respect to the solenoid SOL–2, thus to prevent printing in such a run. Similarly, a cull control switch 750 is closed, this switch having one movable contact connected by a wire 751 and 752 through an electrically operated cull counter 753 to the terminal block 725. The other movable contact of this switch is connected by a wire 755 to one terminal of the solenoid SOL–5. The other terminal of the solenoid SOL–5 is connected by a wire 756 to the terminal 725.

The stationary contacts of the switch 750 are connected together, and are connected by wires 757 and 758 to one contact of the cull timing switch TS–3, the other contact of which is connected by a wire 759 to the No. 4 contact of the relay R–2. With this arrangement, when a printing device fails to meet the qualifications established so that the relay R–2 is not operated, the contacts 4 and 5 thereof remain engaged, and the cull counting circuit through the counter 753 and the solenoid actuating circuit through the solenoid SOL–5 are completed, and the printing device will thus be discharged into the cull drawer K–1. When a printing device is found to be qualified, so as to cause operation of the relay R–2, the cull circuit will be broken at the contacts 4—5, and hence such printing device will be returned to the collection in the drawer K–2 or K–3.

The control of the relay R–2 by the selector switch 265

As described in the aforesaid Gollwitzer Patent No. 2,568,064, the selector switch 265 is set to different levels by the sensed absence of a tab 65, by the sensed presence of a tab 65, and by the different lengths of sensing pin that may sense such a tab. This functioning is utilized in the present instance to extend circuit in the desired circumstances from the line wire 605 to the terminal block 730, thereby to energize the relay R–2. Thus, as shown in Fig. 24, a wire 770 extends from the terminal 720 to one contact of the timing switch TS–1, and from the other contact of the switch TS–1, a wire 771 extends to a terminal block 772. A wire 773 extends from the block 772 to the stationary contact arms 265A of the selector switch 265.

When the selector switch 265 is set in its lower position, due to the absence of a tab 65 in alignment with a sensing pin, the switch extends circuit from one of the arms 265A to a wire 774 that extends to the left-hand, stationary contact of a selector-setting switch 775. When the selector switch 265 is set in its next higher position, circuit is similarly extended by a wire 774P to the right-hand stationary contact of the switch 775. The left-hand contact thus constitutes a skip-tab contact, and the center stationary contact of the switch 775 may be termed an "off" contact. The movable contact of the switch 775 may be manually engaged with any one of these three contacts, and when it is set for example to the right or print contact it may extend circuit by a wire 777 to the lower right contact of a double-throw, double-pole setting switch 780. An extension 777A of the wire 777 also connects with the upper left stationary contact of the switch 780, so that when this switch is set in its upper position, circuit is extended through the left-hand movable contact and a wire 781 to the terminal block 730. Hence, the closure of the proper circuit by the selector switch 265 results in operation of the relay R-2, with the corresponding operation of the setting solenoid SOL-2, for example, as hereinbefore described.

It should be observed that when the switch 775 is set to its center or off position, the wire 777 is connected through the off contact and a wire 783 to the block 772. Also, a wire 784 extends from the block 772 to the upper right contact of the switch 780, for purposes that are described in our aforesaid parent application.

*The control of the printing machine by the qualifier unit 41*

The qualifier unit 41 is arranged, as described in our aforesaid parent application, to complete a circuit between two terminals 800 and 801 when the sensed data representations 60 meet predetermined standards or qualifications, and as shown in Fig. 24 of the drawings, such terminals 800 and 801 may be so connected through the switch 780 and through an off-on switch 805, that control of the circuit to the terminal block 730, and hence to the relay R-2, may be attained under the joint control of the qualifier unit 41 and the selector switch 265, or under control of either. Thus, the terminal 800 is connected by a wire 806 to the upper left contact of the switch 805, while the left movable contact thereof is connected by a wire 807 to the terminal block 730. The terminal 801 is connected by a wire 808 to the lower left contact of the switch 805, and a wire 809 from this contact extends to the right-hand movable contact of the switch 780.

Thus, when the switch 805 is in its upper position, the qualifier unit 41 is in proper operative association with the control means for the relay R-2, and when the switch 780 is in its upper position, either the selector switch 265 or the qualifier unit 41 may serve to operate the relay R-2. Such operation of the qualifier unit 41 it should be noted that the requisite circuit is extended from the timing switch TS-1 through the wires 771 and 784, the wires 809 and 808 to the terminal 801, through the qualifier unit 41 and back to the terminal 800, from which circuit is completed to the terminal block 730 by wires 806 and 807.

When the switch 780 is in its lower position, the selector switch 265 and the qualifier unit 41 are placed in joint control of the relay R-2. Thus the circuit from the timing switch TS-1 must under such circumstances be extended by the selector switch to the wire 777 and through the switch 78 and the wires 809 and 808 to the terminal 801, and then through the qualifier unit 41 and back through the terminal 801, and then through the qualifier unit 41 and back through the terminal 800 to the terminal block 730.

When the machine is to be operated without the controlling action of either the selector switch 265 or the qualifier unit 41, the switches 775, 780 and 805 are set to their "off" position, and under such circumstances, the relay R-2 is energized in each cycle by a circuit from the timing switch TS-1, the wire 783, switch 775, wire 777, the switch 780, the wire 809, switch 805 and the wire 807 to the terminal block 730.

The specific manner of association of the qualifier unit 41 with the printing machine is not considered to be particularly important in connection with the present invention, but reference may be had to our aforesaid parent application for such details.

*Conclusion*

From the foregoing description it will be evident that the present invention provides an improved means for governing the discharge of printing devices from printing machines, and that such means are particularly adapted for automatic actuation and control.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a printing machine through which different groups of printing and control devices, each adapted to bear identifying means, including a group identification on at least one such device in each group, at one or more selected identifying positions thereon, are adapted to be passed, one by one into and through a series of positions in the machine, including a sensing position, an impression position and a discharge position, impression means at said impression position, sensing means at said sensing position for sensing such identifying means including group identifications, print-skip control means for said impression means governed by said sensing means, at least two stations in the machine arranged in spaced relation one with the other and the discharge position and to which the devices may be passed after movement thereof into said discharge position, track means along which the devices may advance from the discharge position to pass to said stations, advancing means for advancing the devices along said track means from said discharge position and into said stations, first and second gates in said track means and on which said devices come to rest in succession after advancing movement thereof by said advancing means, means operable after each advancing movement of such a device for withdrawing said second gate and said first gate yieldingly, a rock shaft having effective and ineffective positions, a blocking member on said shaft arranged when said shaft is in said effective position to block said first gate and prevent withdrawal thereof, a cam operable in successive indexing movements to alternately dispose said shaft in effective and ineffective positions, storage means operatively associated with said sensing means and adapted to be set up as an incident to sensing a group identification, and means actuated by said storage means in set up condition to impart an indexing movement to said cam.

2. In a printing machine through which different groups of printing and control devices, each adapted to bear identifying means, including a group identification on at least one such device in each group, at one or more selected identifying positions thereon, are adapted to be passed, one by one into and through a series of positions in the machine, including a sensing position, an impression position and a discharge position, impression means at said impression position, sensing means at said sensing position for sensing such identifying means including group identifications, print-skip control means for said impression means governed by said sensing means, at least two stations in the machine arranged in spaced relation one with the other and the discharge position and to which the devices may be passed after movement thereof into said discharge position, track means along which the devices may advance from the discharge position to pass to said stations, advancing means operable through advancing and return movements for advancing the devices along said track means from said discharge position and into said stations, first and second gates in said track means and on which said devices come to rest in succession after advancing movement thereof by said advancing means, means operated by said advancing means in each of the return movements thereof for withdrawing said second gate and said first gate yieldingly, a rock shaft having effective and ineffective positions, a blocking member on said shaft arranged when said shaft is in said effective position to block said first gate and prevent withdrawal thereof, a cam operable in successive indexing movements to alternately dispose said shaft in effective and ineffective positions, storage means operatively associated with said sensing means and adapted to be set up as an incident to sensing of a group identification by said sensing means, and means actuated by said storage means when thus set up to impart an indexing movement to said cam.

References Cited in the file of this patent

UNITED STATES PATENTS

| | | |
|---|---|---|
| 1,299,437 | Duncan | Apr. 8, 1919 |
| 1,717,858 | Thomas | June 18, 1929 |
| 1,777,892 | Pierce | Oct. 7, 1930 |
| 2,165,415 | Rindfleisch | July 11, 1939 |
| 2,390,583 | Gollwitzer | Dec. 11, 1945 |
| 2,456,273 | Gruver | Dec. 14, 1948 |
| 2,539,995 | Ghertman | Jan. 30, 1951 |

FOREIGN PATENTS

| | | |
|---|---|---|
| 392,612 | Great Britain | May 22, 1933 |